United States Patent
Hsu et al.

(10) Patent No.: US 10,595,458 B2
(45) Date of Patent: Mar. 24, 2020

(54) POWERED HAND-HELD SPREADER

(71) Applicant: OMS INVESTMENTS, INC., Los Angeles, CA (US)

(72) Inventors: Paul E. Hsu, Lewis Center, OH (US); Paul M. Havlovitz, Dublin, OH (US); Ryan R. Berger, Columbus, OH (US); Chris W. Cicenas, Etna, OH (US); Daniel F. Wisniewski, Columbus, OH (US); Johannes Hertrich, Columbus, OH (US)

(73) Assignee: OMS Investments, Inc., Los Angeles, CA (US)

( * ) Notice: Subject to any disclaimer, the term of this patent is extended or adjusted under 35 U.S.C. 154(b) by 125 days.

(21) Appl. No.: 15/234,095

(22) Filed: Aug. 11, 2016

(65) Prior Publication Data
US 2017/0049042 A1    Feb. 23, 2017

Related U.S. Application Data

(60) Provisional application No. 62/207,608, filed on Aug. 20, 2015.

(51) Int. Cl.
*A01C 15/02* (2006.01)
*E01H 10/00* (2006.01)
(Continued)

(52) U.S. Cl.
CPC ........... *A01C 15/02* (2013.01); *E01H 10/007* (2013.01); *A01C 7/02* (2013.01); *E01C 2019/206* (2013.01)

(58) Field of Classification Search
CPC ..... A01C 17/005; A01C 15/02; A01C 15/006; A01C 17/008; A01C 17/003; A01C 7/02; E01H 10/007; E01H 2019/206
See application file for complete search history.

(56) References Cited

U.S. PATENT DOCUMENTS 3,993,225 A    11/1976 Manni
4,062,496 A *  12/1977 Melton ................ A01C 15/007
                                              222/228
(Continued)

OTHER PUBLICATIONS

"Black & Decker Motorised Law Seed/Fertiliser Spreader: Amazon. co.uk: DIY Tools," http://www.amazon.co.uk/Black-Decker-Motorised-Fertiliser-Spreader/dp/B000NY1E8K, front page [Internet accessed on Feb. 25, 2015].

(Continued)

*Primary Examiner* — Arthur O. Hall
*Assistant Examiner* — Steven M Cernoch
(74) *Attorney, Agent, or Firm* — Ulmer & Berne LLP

(57) ABSTRACT

A powered hand-held spreader device is disclosed that has a handle that allows a user to grip and hold the device with one hand. The spreader includes an adjustable shutter, controlled by a rotary dial, to allow for distribution of a range of different granular products that require different flow rates for distribution. The granular product is contained in a hopper. The product can be distributed over various types of terrain, including, but not limited to, lawns, gardens, and paths. The spreader is driven by an electric motor actuated by a trigger. A spinning rotor plate distributes the granular product fed from the hopper. A trigger lock is optionally available to lock the trigger in the "on" position during use and to prevent actuation when the trigger is in the "off" position. An adjustable side deflector optionally can be used to control the distribution pattern of the granular product.

27 Claims, 27 Drawing Sheets

(51) Int. Cl.
*E01C 19/20* (2006.01)
*A01C 7/02* (2006.01)

(56) References Cited

U.S. PATENT DOCUMENTS

| | | | |
|---|---|---|---|
| 4,071,170 A | 1/1978 | Gunzel, Jr. et al. |
| 4,089,441 A | 5/1978 | Cole et al. |
| 4,140,280 A | 2/1979 | Allen et al. |
| 4,387,852 A | 6/1983 | Mattson et al. |
| 4,492,341 A | 1/1985 | Allen |
| 4,678,377 A | 7/1987 | Bouchard |
| 5,119,993 A | 6/1992 | Gunzel et al. |
| 5,123,598 A | 6/1992 | Courtney et al. |
| 5,285,971 A | 2/1994 | Havlovitz |
| 5,409,166 A | 4/1995 | Gunzel et al. |
| 5,429,278 A | 7/1995 | Sansalone |
| 6,024,294 A | 2/2000 | Dillon |
| 6,092,746 A | 7/2000 | Dillon |
| 6,425,500 B2 | 7/2002 | McNally |
| 6,616,074 B2 | 9/2003 | Courtney |
| 6,729,557 B2 | 5/2004 | Dillon |
| 6,840,468 B2 | 1/2005 | Barnett |
| 7,281,675 B2 | 10/2007 | Elrod et al. |
| 7,328,861 B2 | 2/2008 | Sagol et al. |
| 8,272,584 B2 | 9/2012 | Barnett et al. |
| 2006/0016918 A1* | 1/2006 | Sagol ............... A01C 15/02 239/653 |
| 2007/0194155 A1 | 8/2007 | Kendall |
| 2013/0001332 A1 | 1/2013 | Marconi |
| 2014/0166785 A1 | 6/2014 | Barnett et al. |
| 2014/0263484 A1 | 9/2014 | Marconi |

OTHER PUBLICATIONS

"New Ready 2Go Spreader," http://www.ready2gospreader.com/ 4 pages [Internet accessed on Feb. 25, 2015].

"WOLF Garten Power Spreader WE-B," spec page (Jan. 2014). Detail view of "WOLF Garten WE-B Power Spreader," http://www.wolf-garten.org/products/seeds-and-fertiliser/spreaders-and-hose-reel-trolleysdetails, 5 pages [Internet accessed on Nov. 23, 2015].

* cited by examiner

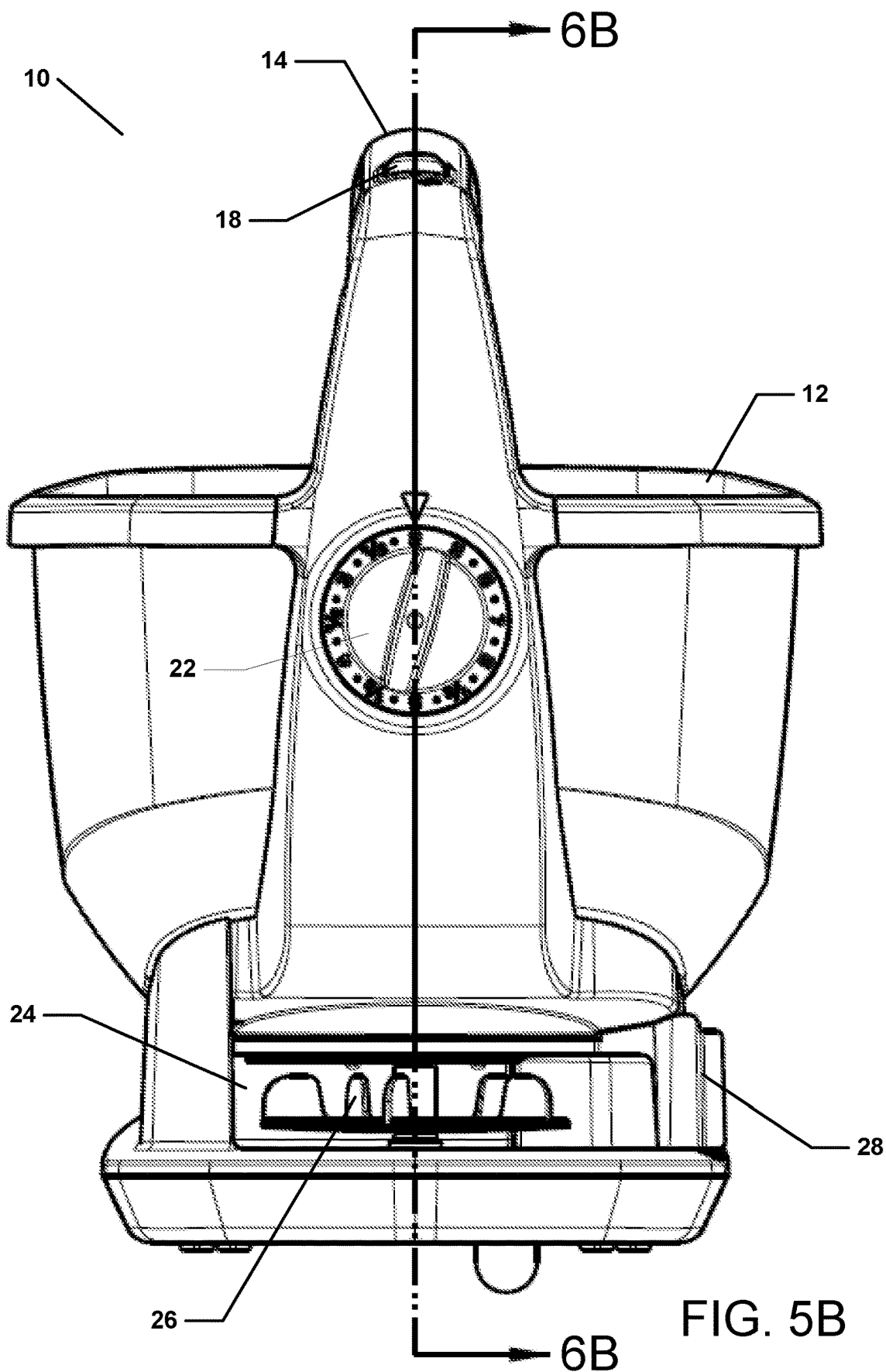

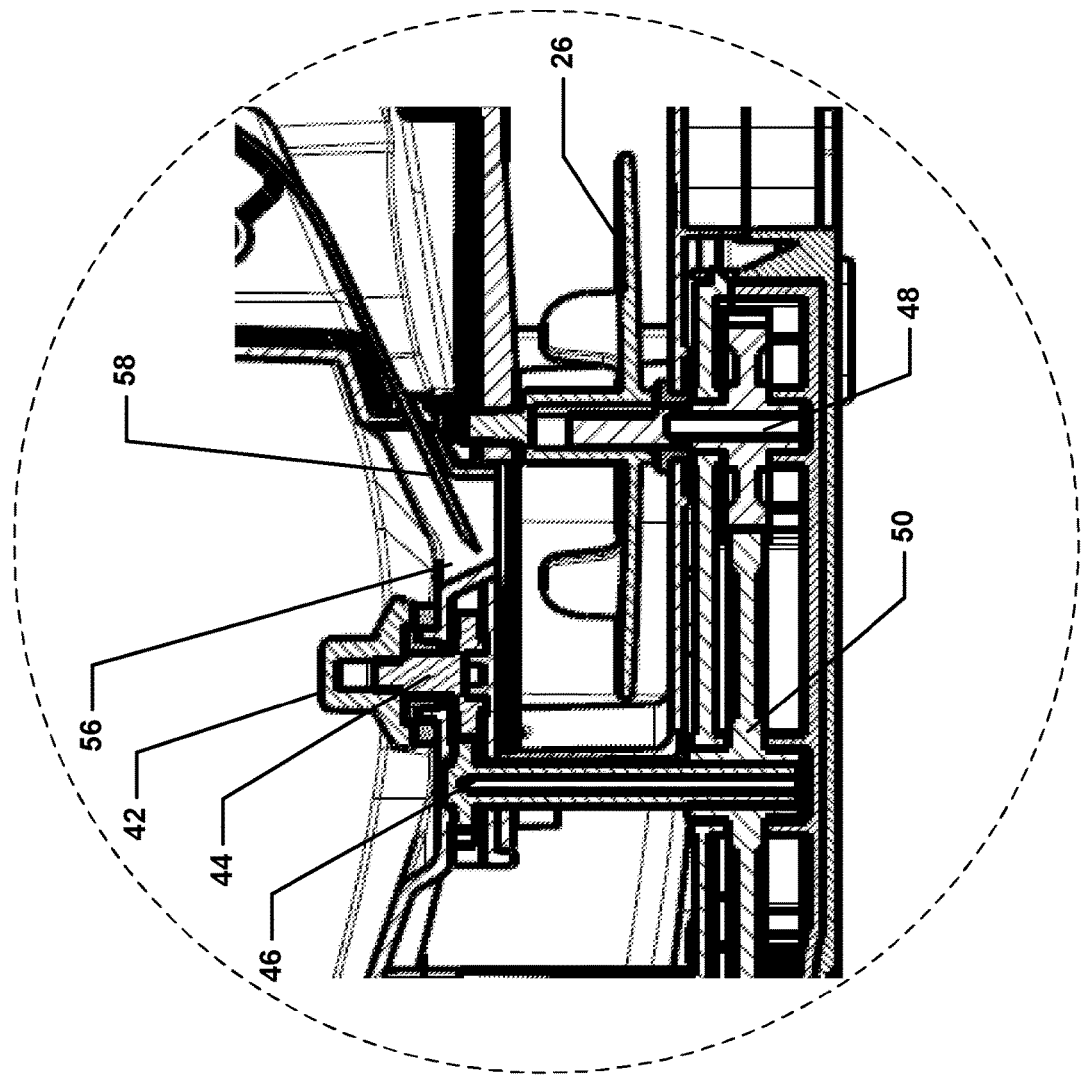

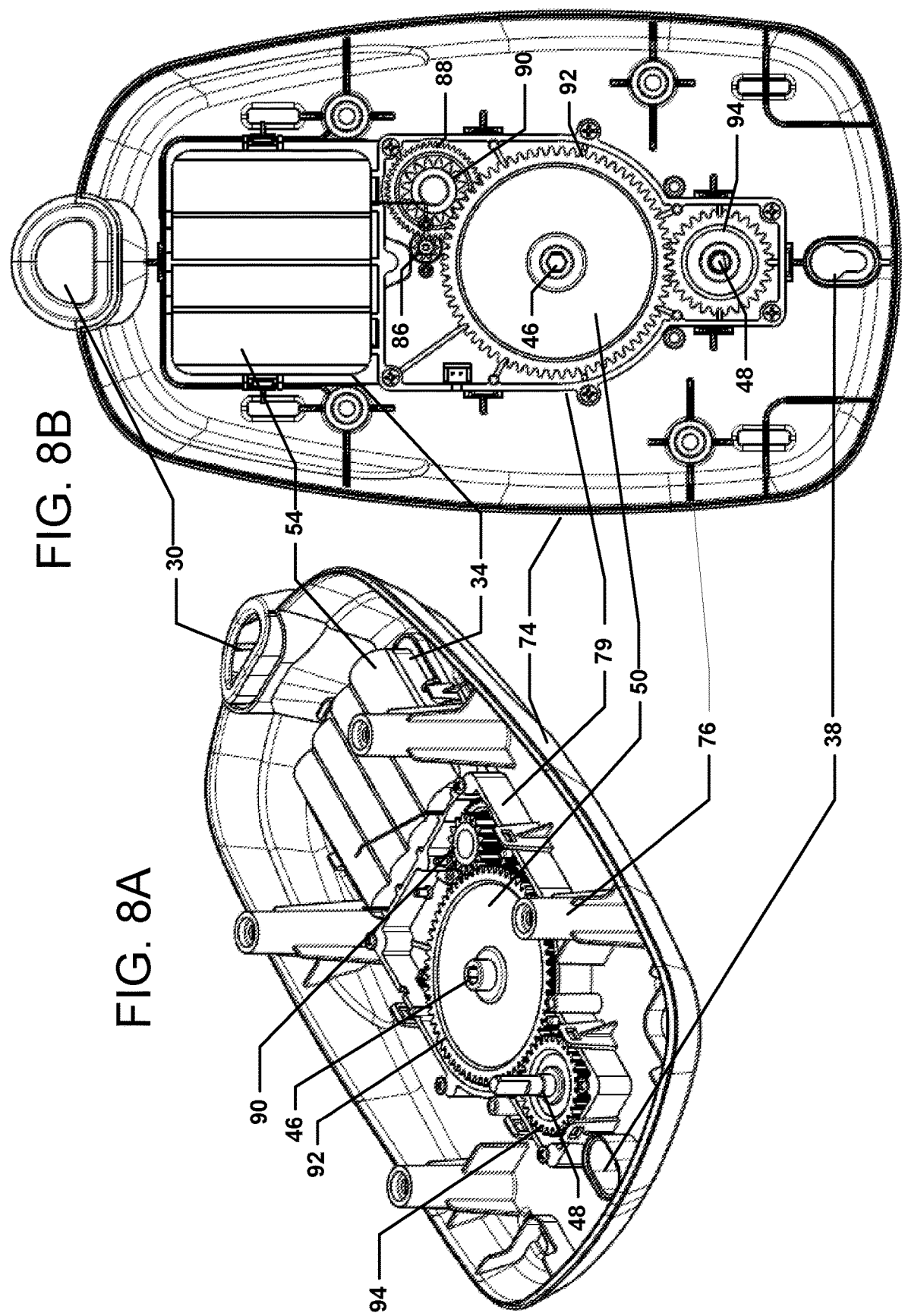

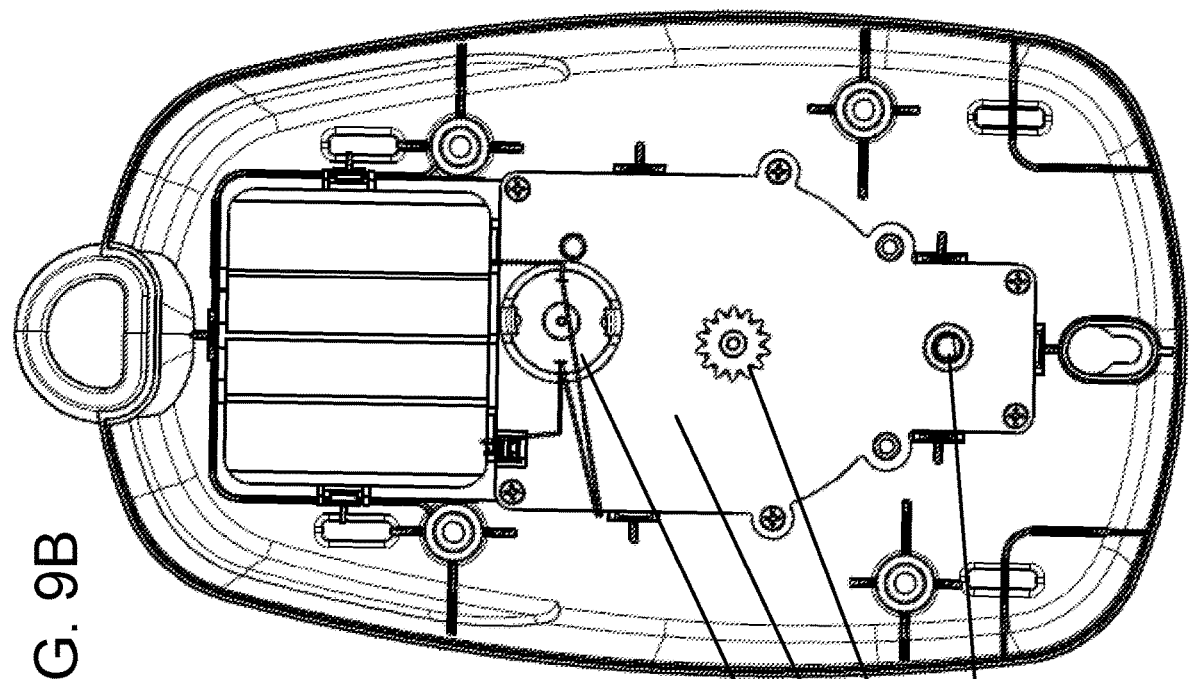
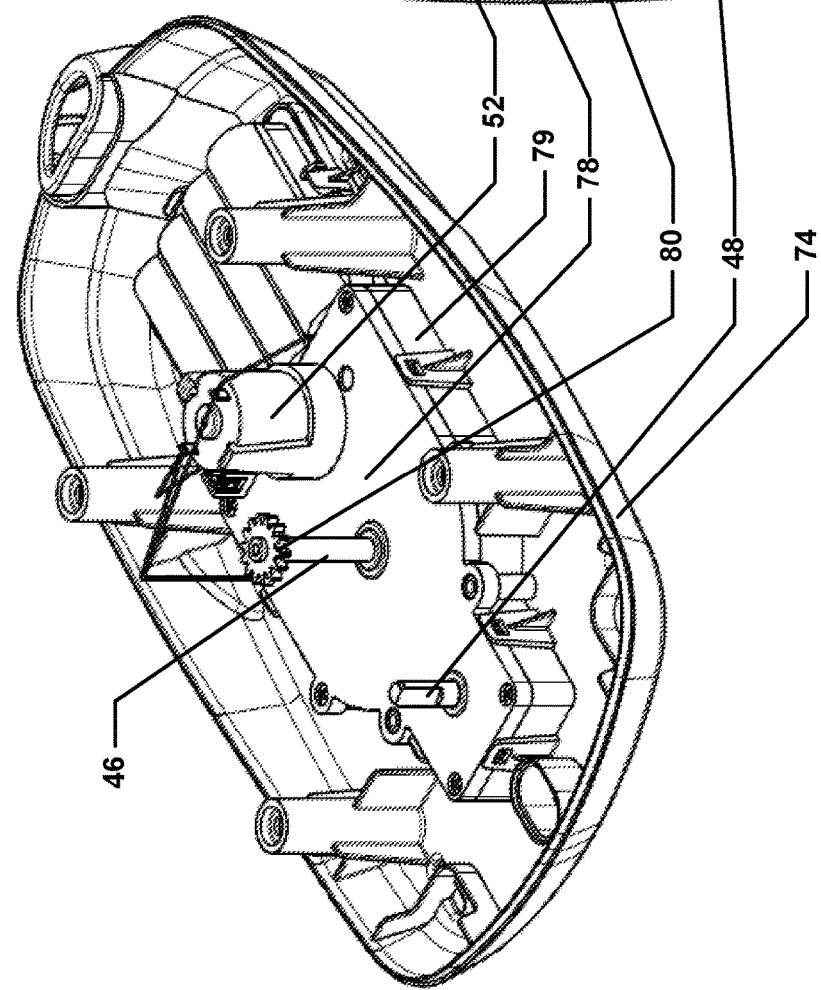
FIG. 9B
FIG. 9A

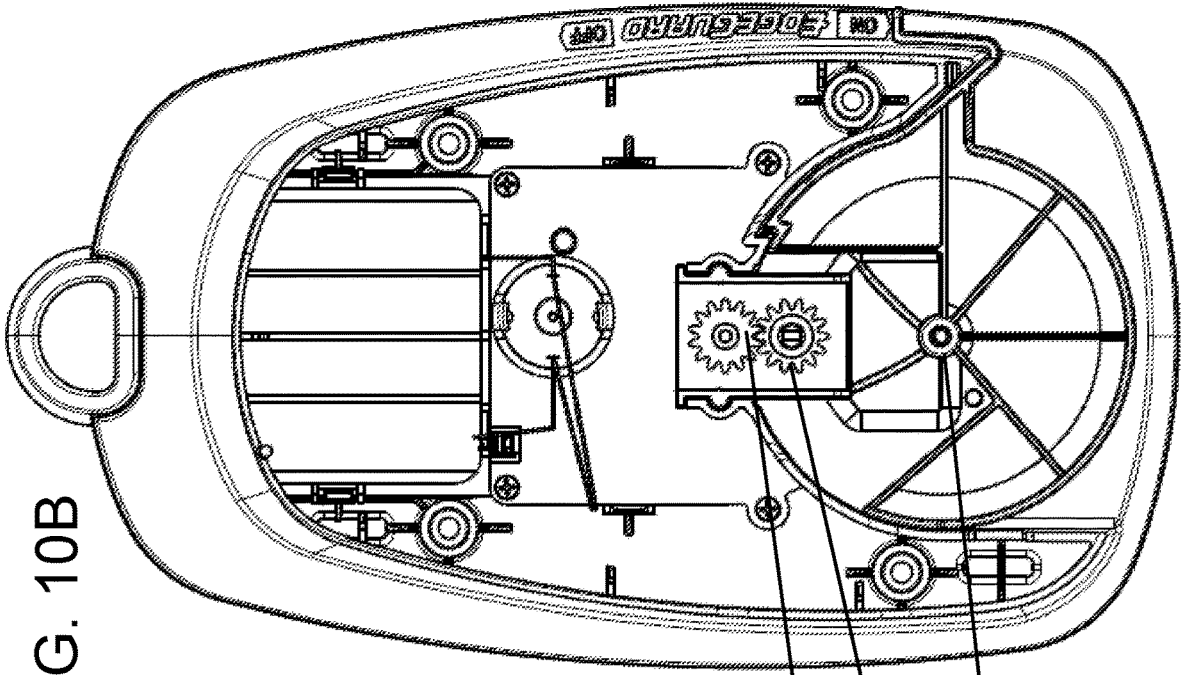

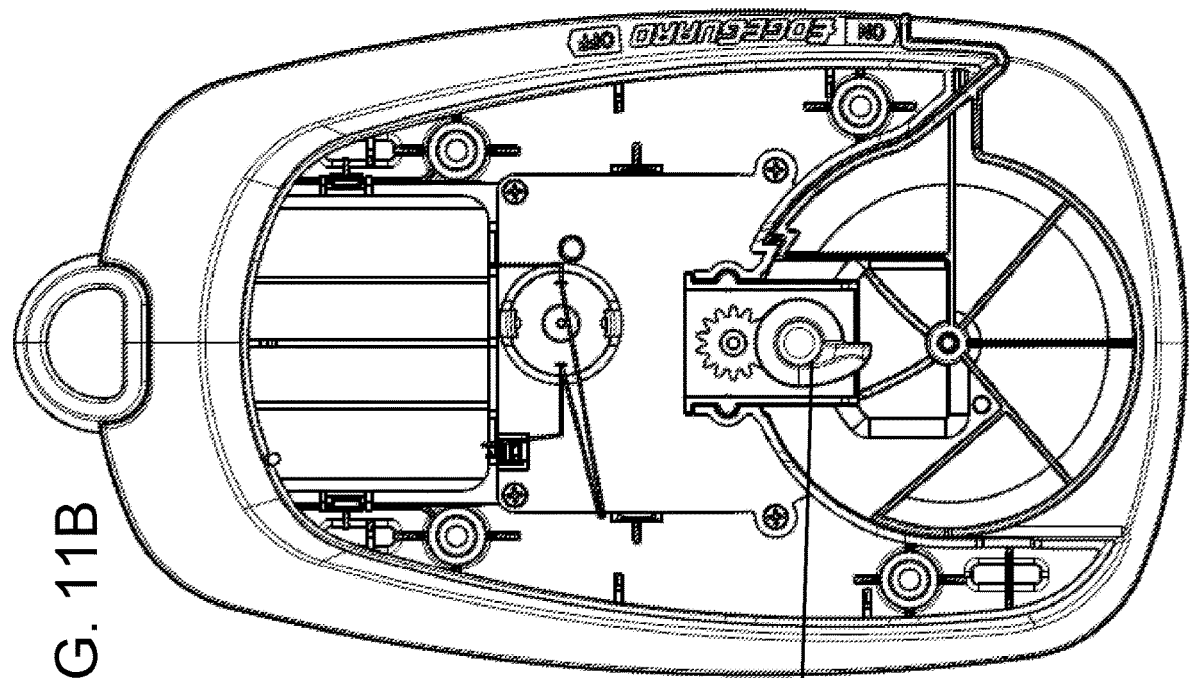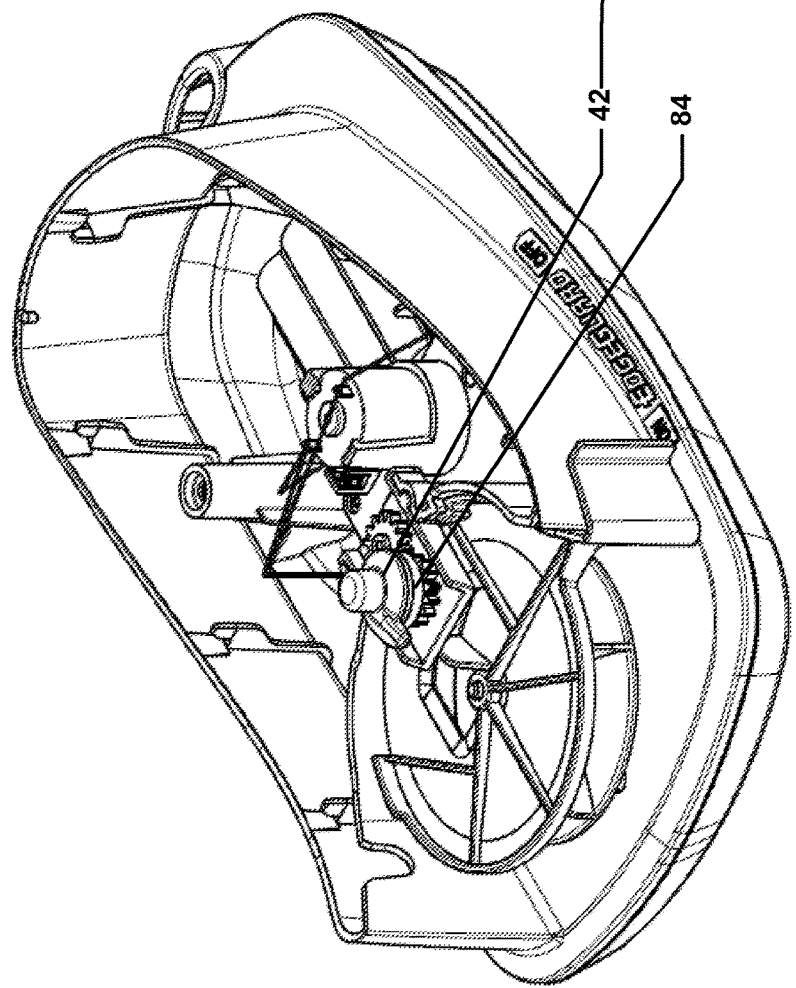

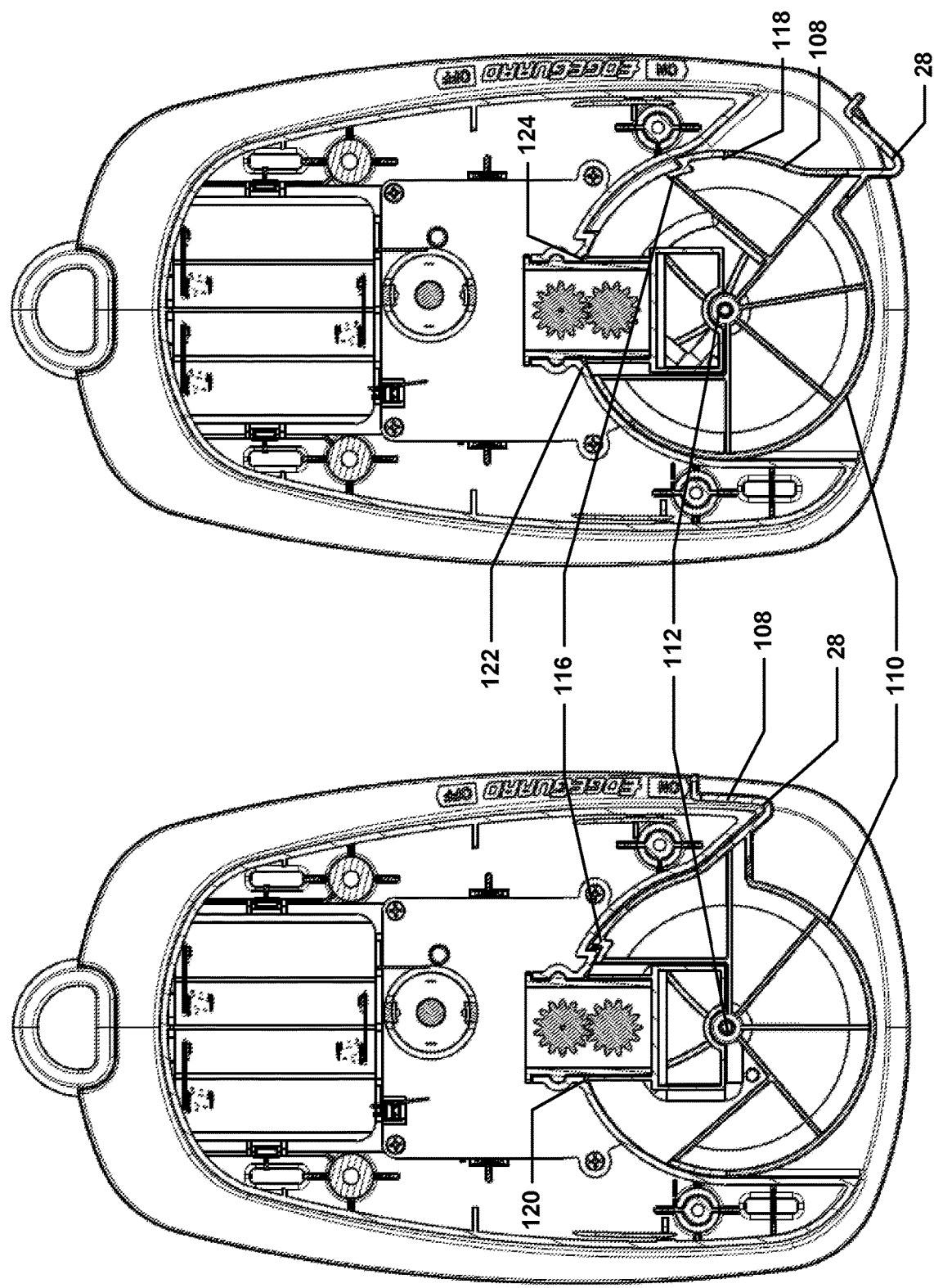

POWERED HAND-HELD SPREADER

CROSS-REFERENCE TO RELATED APPLICATIONS

This application claims priority to U.S. Provisional Application No. 62/207,608, filed Aug. 20, 2015, entitled "Powered Hand-Held Spreader." The disclosure of this priority application is incorporated herein by reference in its entirety.

FIELD OF THE VARIOUS EMBODIMENTS

The systems and methods described herein relate to a hand-held spreader device which is used in the consumer, professional or industrial markets, for example, to distribute granular product over terrain or other surfaces, and more particularly the description herein relates to a battery powered hand-held spreader device to distribute granular product over terrain or other surfaces.

BACKGROUND

Consumers distribute granular products using spreaders. Spreaders include larger, wheeled type spreaders and smaller, hand-held spreaders. Both types of spreaders are typically manually operated.

These and other deficiencies exist.

SUMMARY OF THE VARIOUS EMBODIMENTS

Exemplary embodiments include a portable device suitable for spreading granular product having a spreader body that has a hopper with an open upper portion and an internal volume configured to contain an amount of granular product for spreading over terrain or other surfaces, and further comprising an outlet located in a bottom portion of the hopper; a handle integral to the spreader body; a motor disposed in a lower portion of the spreader body, below the hopper; a gear train driven by the motor; a rotor plate for spreading the granular product located below the outlet and driven by the gear train through a first shaft; an agitator mounted in the hopper, proximate to the outlet, and driven by the gear train through a second shaft; a trigger, mounted in the handle, that is movable between a first position in which the motor is off and a second position in which the motor is actuated, the trigger configured to default to the first position, the trigger being operably coupled to a trigger mechanism; a rotary dial, coupled to a forward portion of the spreader body below the handle, the rotary dial being rotatably movable between a plurality of settings; a shutter cam, coupled internally to the rotary dial, for adjusting a shutter plate distance of travel, located proximal to the outlet, based on a selected setting of the rotary dial; and the shutter plate being coupled to the shutter cam and being movable with respect to the outlet, the shutter plate being movable such that when the trigger is in the first position the shutter plate covers the outlet and when the trigger is in the second position, the shutter plate is retracted from the outlet traveling a distance based on the selected setting of the rotary dial through movement of the trigger mechanism.

Another exemplary embodiment includes a portable hand-held spreader device having a hopper for holding an amount of granular product for spreading over terrain or other surfaces, the hopper having an outlet for exhausting the granular product; a handle means for holding the container; a spreading means for spreading the granular product that is located below the holding means and driven by a power source; an agitator means for agitating the granular product located within the container and proximate the outlet; a trigger mechanism for actuating the power source and moving a shutter plate; and a control means for controlling an opening size of the outlet through control of the shutter plate distance of travel, that has a plurality of settings, such that each setting adjusts the distance of travel of the shutter plate located proximal to the outlet and coupled to the control means.

Another exemplary embodiment includes a portable hand-held spreader device having a hopper configured to contain granular product for spreading over terrain or other surfaces including an outlet; a handle overhanging the hopper; a motor; a gear train driven by the motor; a rotor plate for spreading the granular product located below the outlet and driven by the gear train; an agitator mounted in the hopper, proximate the outlet, and driven by the gear train; a trigger mounted in the handle; a trigger mechanism coupled to the trigger comprising a first spring and a second spring and a stop, wherein the first and second springs are compressed during operation of the trigger mechanism; a shutter plate coupled to the trigger mechanism; a rotary dial that is rotatably movable between a plurality of settings; a shutter cam, coupled internally to the rotary dial, for adjusting a distance of travel the shutter plate based on a selected setting of the rotary dial such that the stop of the trigger mechanism is configured to contact the shutter cam; and the shutter plate being coupled to the shutter cam and being movable with respect to the outlet, the shutter plate being movable such that when the trigger is in a first position the shutter plate covers the outlet and when the trigger is in a second position, the shutter plate is retracted from the outlet through movement of the trigger mechanism, traveling a distance based on the selected setting of the rotary dial such that retraction of the shutter plate stops when the stop contacts the shutter cam.

These and aspects of the exemplary embodiments will become apparent from the following detailed description, taken in conjunction with the accompanying drawings, illustrating by way of example the principles of the various exemplary embodiments.

DESCRIPTION OF THE FIGURES

FIG. 5B depicts a front view of a powered hand-held spreader device with the shutter dial set to a minimum setting and the trigger depressed according to exemplary embodiments.

FIGS. 6E and 6F depict partial views of FIG. 6B according to exemplary embodiments.

FIGS. 8A and 8B depict a cut-away view of a lower portion of a powered hand-held spreader device according to exemplary embodiments.

FIGS. 9A and 9B depict a second cut-away view of a lower portion of a powered hand-held spreader device according to exemplary embodiments.

FIGS. 10A and 10B depict a third cut-away view of a lower portion of a powered hand-held spreader device according to exemplary embodiments.

FIGS. 11A and 11B depict a fourth cut-away view of a lower portion of a powered hand-held spreader device according to exemplary embodiments.

FIGS. 17A and 17B depict cut-away views of a powered hand-held spreader device showing the operation of the adjustable side deflector feature according to exemplary embodiments.

DETAILED DESCRIPTION OF THE VARIOUS EMBODIMENTS

Figure 1:
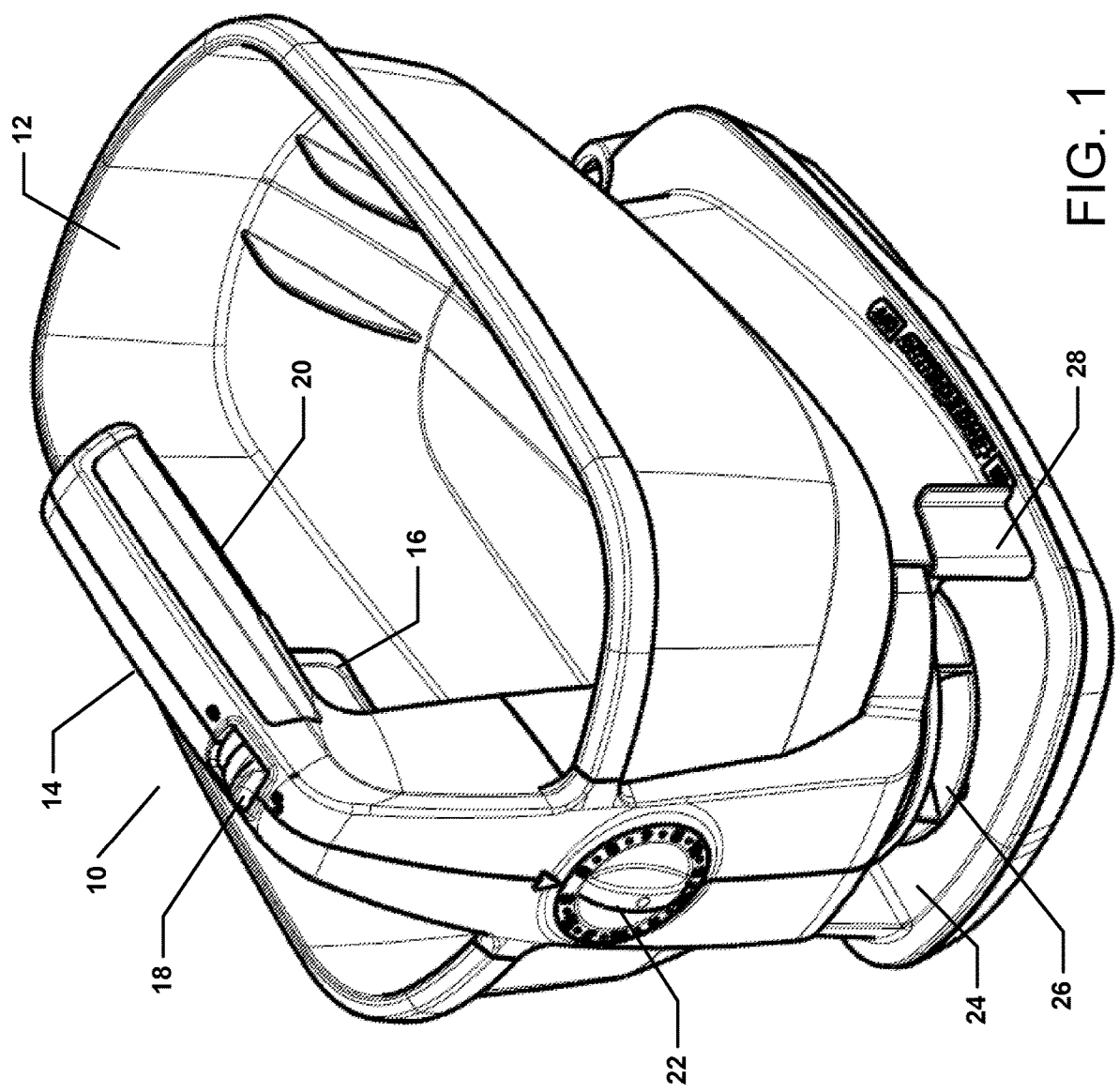
FIG. 1 depicts a front perspective view of a powered hand-held spreader device according to exemplary embodiments.
Figure 2:
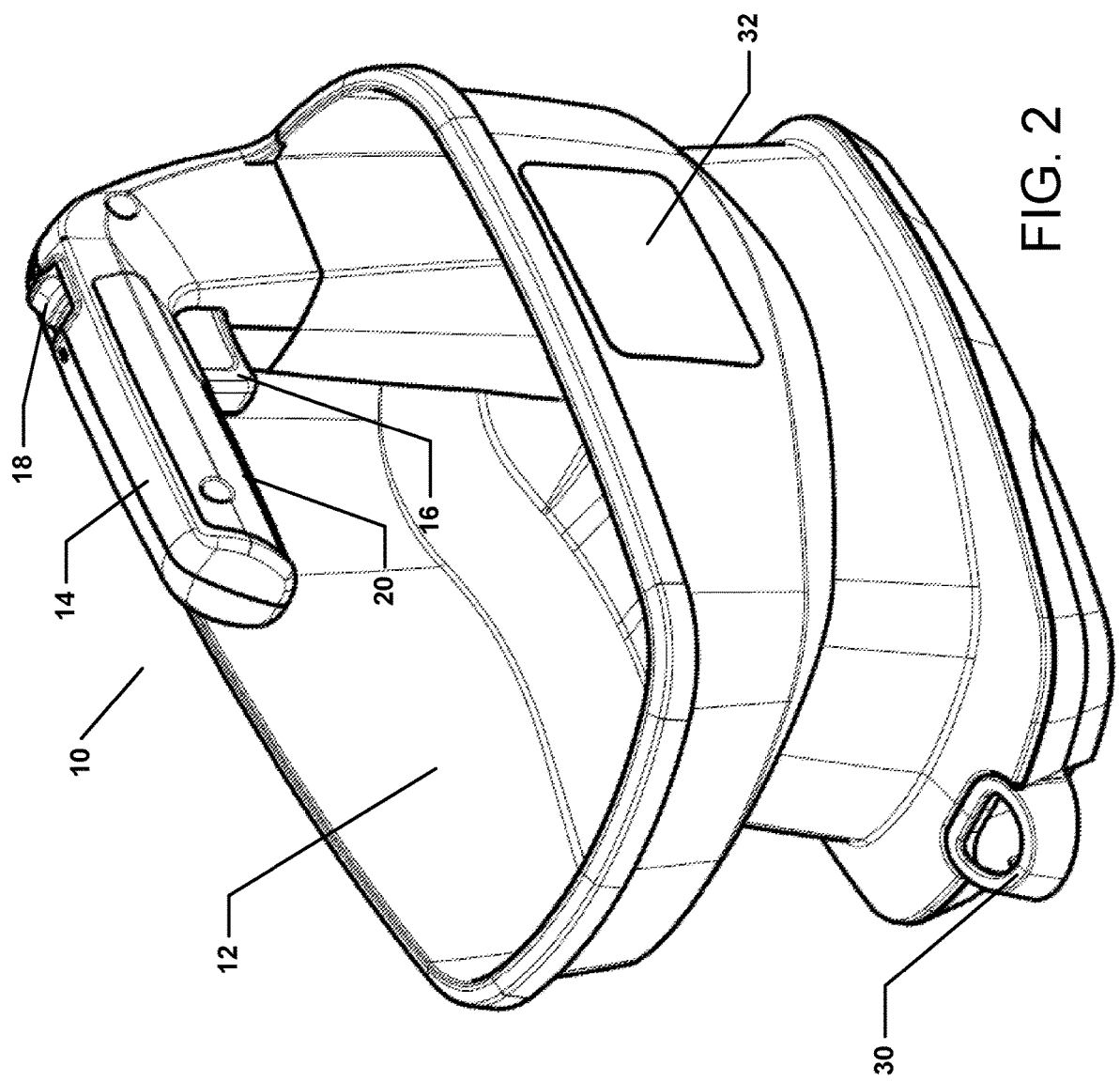
FIG. 2 depicts a rear perspective view of a powered hand-held spreader device according to exemplary embodiments.
Figure 3:
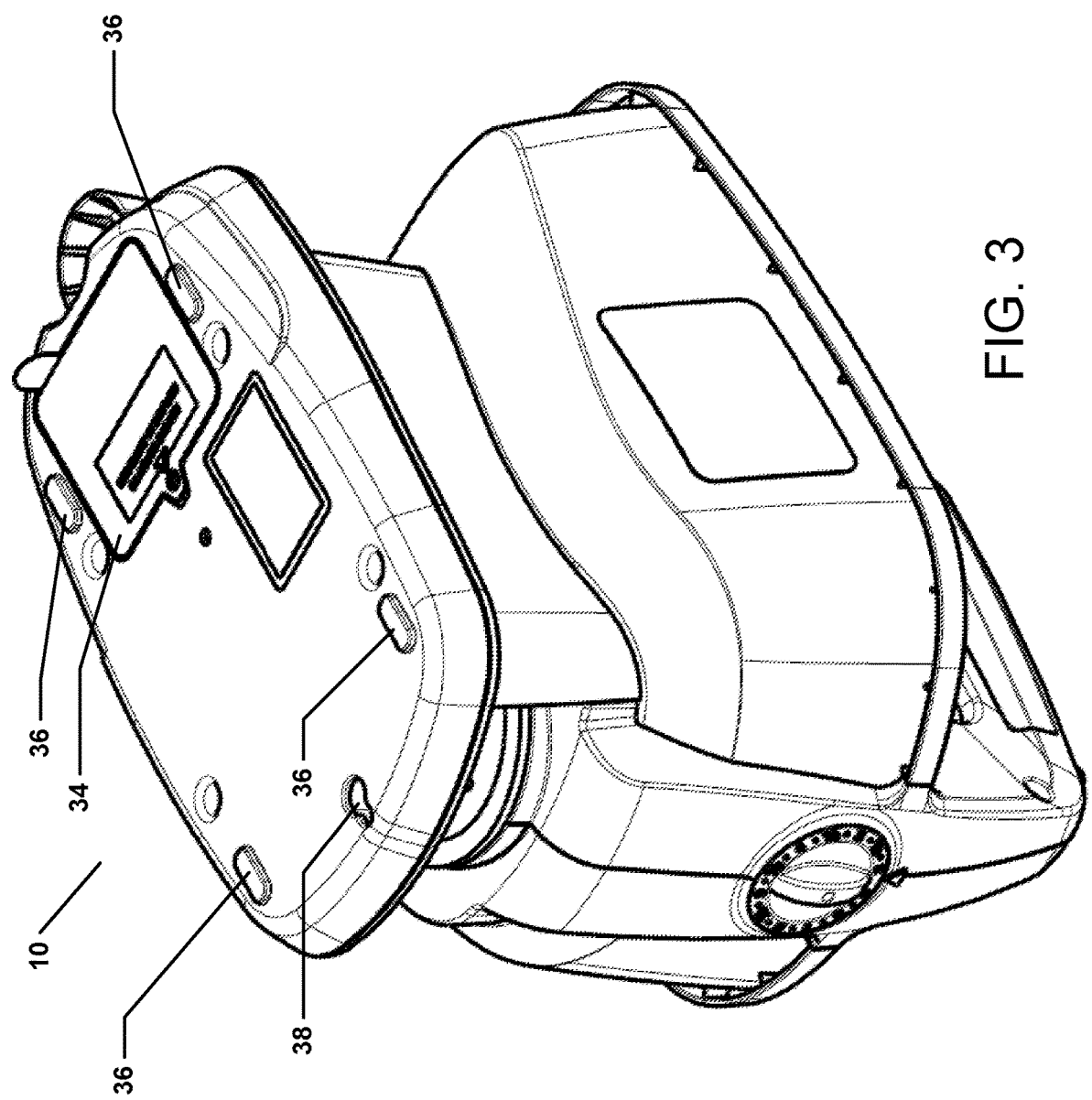
FIG. 3 depicts a front bottom perspective view of a powered hand-held spreader device according to exemplary embodiments.
Figure 4:
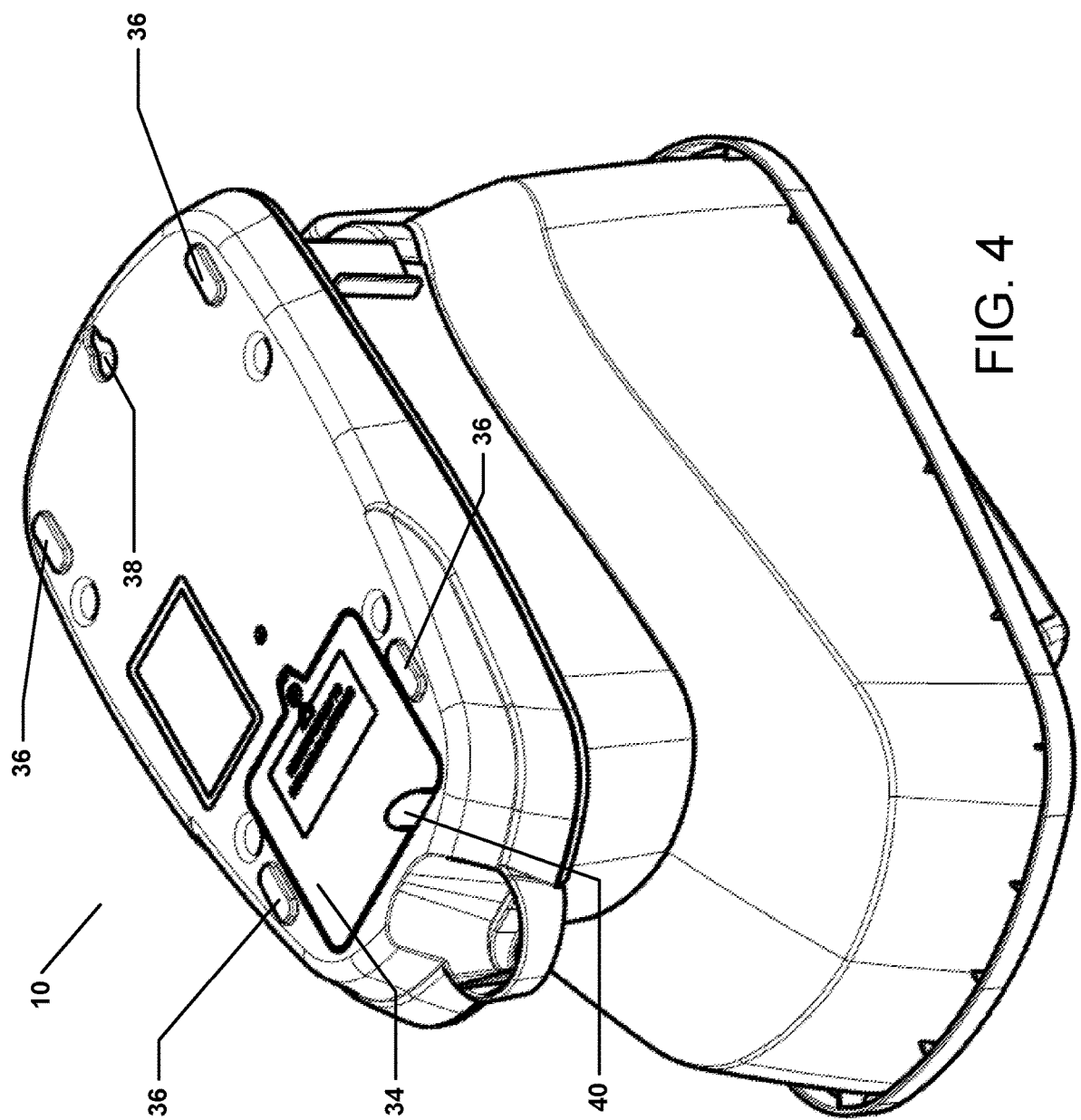
FIG. 4 depicts a rear bottom perspective view of a powered hand-held spreader device according to exemplary embodiments.

It will be readily understood by those persons skilled in the art that the embodiments described herein are capable of broad utility and application. Accordingly, while the various embodiments are described herein in detail in relation to the exemplary embodiments, it is to be understood that this disclosure is illustrative and exemplary of embodiments and is made to provide an enabling disclosure of the exemplary embodiments. The disclosure is not intended to be construed to limit the various embodiments or otherwise to exclude any other such embodiments, adaptations, variations, modifications and equivalent arrangements.

The following descriptions are provided of different configurations and features according to exemplary embodiments. These configurations and features relate to a powered hand-held spreader device for spreading granular material over terrain or other surfaces. While certain nomenclature and types of applications or hardware are described, other names and applications or hardware usage is possible and the nomenclature provided is done so by way of non-limiting examples only. Further, while particular embodiments are described, these particular embodiments are meant to be exemplary and non-limiting and it further should be appreciated that the features and functions of each embodiment may be combined in any combination as is within the capability of one of ordinary skill in the art.

Exemplary embodiments include a hand-held spreader device. The spreader device is powered. The spreader device has a handle that allows a user to grip and hold the device with a single hand. The handle may overhang the hopper. Accordingly, the spreader device is balanced for single hand use. The handle may be ergonomically configured to reduce strain on the user when operating the spreading device. A hopper contains the granular product desired to be spread. The hopper is loaded by pouring the granular product therein from another container. The power may be supplied by an electric motor that may be powered by one or more replaceable batteries. The batteries may be rechargeable or disposable. A trigger actuates the motor to drive a spinning rotor plate which distributes granular product. A trigger lock may be available to lock the trigger in the "on" position during use and to prevent actuation when the trigger is in the "off" position. A gear train may be used to control the rotor plate speed. The spreader device may include an adjustable shutter allowing for distribution of a range of different granular products that require different flow rates for distribution as well as controlling the amount of material dispensed from the spreader device. The adjustable shutter controls the opening size of the hopper outlet. A rotary dial may be used to set the adjustable shutter distance of travel to control the opening size. The rotary dial can have a plurality of settings. The granular product can be distributed over various types of terrain, including, but not limited to, lawns, gardens, and paths. An adjustable side deflector can be used to control the distribution pattern of the granular material. The hopper may be configured to allow for unused granular product to be poured back into its original container. It should be appreciated that the foregoing description is of an exemplary embodiment and that other embodiments with varying configurations are possible. For example, various embodiments may lack the trigger lock and/or the adjustable side deflector plate.

The term "granular product," as used throughout this description, refers to product that is particulate (or granular) in nature in that it is a dry (not liquid) product that is flowable. For example, granular product may include without limitation, ice melting granules, fertilizer, pesticides, granular soil amendment material, granular oil absorbent material, dusting products, granular floor cleaning product, grass seed, or any other product, as well as combinations thereof, that is dry and flowable.

The hand-held spreader according to various embodiments may include an adjustable side deflector, which is used to prevent granular product from being thrown, during dispensing, onto sidewalks, driveways, or other areas where the product is not desired, for example, as described in U.S. Pat. No. 6,616,074, which is hereby incorporated by reference in its entirety.

The figures depict various functionality and features associated with exemplary embodiments. While a single illustrative block, sub-system, device, or component is shown, these illustrative blocks, sub-systems, devices, or components may be multiplied for various applications or different application environments. In addition, the blocks, sub-systems, devices, or components may be further combined into a consolidated unit or divided into sub-units. Further, while a particular structure or type of block, sub-system, device, or component is shown, this structure is meant to be exemplary and non-limiting, as other structures may be able to be substituted to perform the functions described.

FIGS. 1 through 5A and 5B depict a powered hand-held spreader device according to exemplary embodiments. The spreader device may be a device configured for broadcasting granular product onto a lawn, terrain, or other surface. Externally, the spreader device 10 has a hopper 12, a handle 14, a trigger 16, a trigger lock 18, a grip portion 20, a shutter dial 22, an opening 24, a rotor plate 26, an adjustable side deflector 28, a battery compartment 34, and feet 36. The spreader device 10 may have other external features as described herein.

The spreader device 10 has a hopper 12. The hopper 12 has an internal volume to hold an amount of granular product. For example, according to an exemplary embodiment, the hopper volume may be 235 in$^3$ and this volume may be sufficient to hold enough granular product to cover 2500 sq. ft. of surface, depending on the setting of the shutter plate. Various embodiments may have different volumes to hold different amounts of product which alters the surface coverage. It should be appreciated that the amount of granular material capable of being contained in the hopper may vary with the particular granular material. For example, different granular materials have different granule sizes such that the coverage resulting from using a particular granular material may vary. Additionally, it should be appreciated that different material may require a different setting on the spreading device (for the shutter plate) which may affect the amount of surface coverage available from the spreader device. Furthermore, different settings on the spreading device may result in altering the available surface coverage available for the spreader device.

The spreader device 10 has a handle 14. According to exemplary embodiments, the handle 14 may be located such that the handle 14 overhangs the hopper 12. In various embodiments, other configurations of the handle are possible. For example, the handle 14 may be located such that the handle faces forward and does not overhang the hopper. A trigger 16 and trigger lock 18 are located on the handle 14. The trigger 16 is located on a lower portion of the handle 14 and the trigger lock 18 is located on an upper portion of the handle 14. In various embodiments, the trigger lock 18 may be optional. The handle 14 may have one or more rubber portions 20. The grip portion 20 may assist with maintaining a secure grip on the handle 14. The grip portion 20 may be located on the bottom and on each side of the handle 14. In various embodiments, the grip portion 20 may cover more extensive portions of the handle 14 such as the top portion. According to exemplary embodiments, the grip portion 20 may be rubber. Other suitable materials may be used. In exemplary embodiments, the body of spreader device 10 is constructed of hard, durable plastic. Other suitable materials and combinations of materials may be used.

The spreader device 10 has a shutter dial 22 located on a forward portion. The shutter dial 22 is used to set an opening size of the shutter plate located at the bottom portion of the hopper 12. The shutter dial 22 moves in a rotary fashion. In various embodiments, the shutter dial may move in a linear fashion. For example, the shutter dial may be a switch that moves in a linear direction, such as vertically (up and down) to change the settings. The shutter dial 22 may have a number of settings. According to exemplary embodiments, the shutter dial may have 23 settings. In various embodiments, more or less settings are possible. An opening 24 is located on a forward portion of the spreader device 10.

Within the opening 24 is a rotor plate 26. The rotor plate 26 is for spreading the granular product. The rotor plate 26 is driven by the spreader device's motor to eject and spread the granular material during operation of the spreader device 10. According to exemplary embodiments, during operation, the rotor plate 26 rotates in a clockwise direction (when viewed from above in use). In various embodiments, the rotor plate 26 may rotate in the opposite direction. The figures depict an exemplary configuration for the rotor plate 26. It should be appreciated that various embodiments may have different configurations. For example, the blade shape and configuration may be altered. In various embodiments other structures could be used for spreading of the granular material. For example, the rotor plate may be replaced by a blower or the rotor may be horizontally oriented (i.e., driven from the side and cylindrically shaped).

The spreader device 10 may have an adjustable side deflector 28. Adjustable side deflector 28 may be a tab, plate, wall, or other structure that is configured to rotate partially over the launching plate thereby partially covering the area where granular product is broadcast from the launching plate.

The spreader device 10 may have a hanger 30 to enable hanging or otherwise securing the spreader device 10 when not in use.

The spreader device 10 may have a label portion 32 for branding and/or labelling. The label portion 32 may be an in-mold label such that it is formed as a part of the spreader device 10. In various embodiments, the label portion 32 may contain a press-on label or sticker. It should be understood that the label portion 32 may have a variety of configurations to accommodate different branding labels. In some embodiments, the label portion 32 may contain instructions and/or warnings and/or safety information. A label portion 32 may be located on the opposite side of the spreader in various embodiments.

A battery compartment 34 is located on the bottom portion of the spreader. The battery compartment 34 may be accessible to change the batteries. The battery compartment 34 may be secured to prevent undesired opening. For example, the battery compartment 34 may be secured by using a screw or snap closure.

The spreader device 10 may have feet 36 located on its bottom portion. The feet 36 may provide stability for the spreader device 10 when placed down on a surface. Exemplary embodiments may have four feet 36.

A hole 38 may be provided on the bottom portion for hanging the spreader on a nail or screw or other protrusion.

When the spreader device 10 is new, such as when initially sold, a tab 40 may project from the battery compartment 34. The tab 40 may be a piece of material that covers one or more of the battery contacts to prevent inadvertent operation of the spreader and/or drain on the batteries prior to use by a consumer. To operate the spreader device 10, the tab 40 is to be pulled and the material removed from the battery compartment.

FIGS. 6A, 6B, 7A, and 7B depicts cross-sectional views of the spreader device 10. FIGS. 6C, 6D, 6E, and 6F depict partial views of FIGS. 6A and 6B, respectively. At a bottom portion of the hopper 12 is an agitator 42. The agitator 42 is coupled to an agitator shaft 44. The agitator shaft 44 is driven by a drive shaft 46. The rotor plate 26 is coupled to a rotor shaft 48. The shafts are driven by and coupled to a gear train 50. The gear train 50 is driven by a motor 52. The gear ratio may be approximately 8:1 according to exemplary embodiments. For example, the final gear ratio may be 8.4:1. The gear train 50 is constructed such that the agitator 42 rotates slower than the rotor plate 26 when driven by the gear train. In various embodiments, other gear and/or drive configurations are possible. For example, a direct drive may be used which incorporates one or more shafts, extending directly from the motor to drive the various structures. The motor 52 is powered by one or more batteries 54 located in the battery compartment 34. Exemplary embodiments may use four AA type batteries. The batteries 54 may be replaceable. Rechargeable or disposable batteries may be used.

Accordingly to exemplary embodiments, the motor 52 is a DC motor. For example, the motor may be a 6-V DC motor type 280 with a no-load speed of 15,000 rpm. This is meant to be exemplary and a non-limiting example as other motor types and sizes may be used. The motor 52 is operated at a constant speed according to exemplary embodiments. Stated differently, the motor 52 is either on or off. For example, the motor 52 operates at the same speed no matter how far the trigger 16 is depressed (after depression, trigger 16 engages the motor contacts to turn the motor on). Various embodiments may employ variable speed operation, governed by depression of the trigger 16. In various embodiments, more than one motor may be used. For example, two motors may be used—one to drive the agitator and one to drive the rotor plate. A direct drive or geared arrangement may be used in this configuration.

The hopper 12 has a hopper opening 56 in its bottom front portion, located forward of the agitator 42. The hopper opening 56 is controlled by a shutter plate 58. For example, the distance of travel of the shutter plate 58, as controlled by the shutter dial 22 determines the size of the portion of the hopper opening 56 that is uncovered.

Figure 6A:
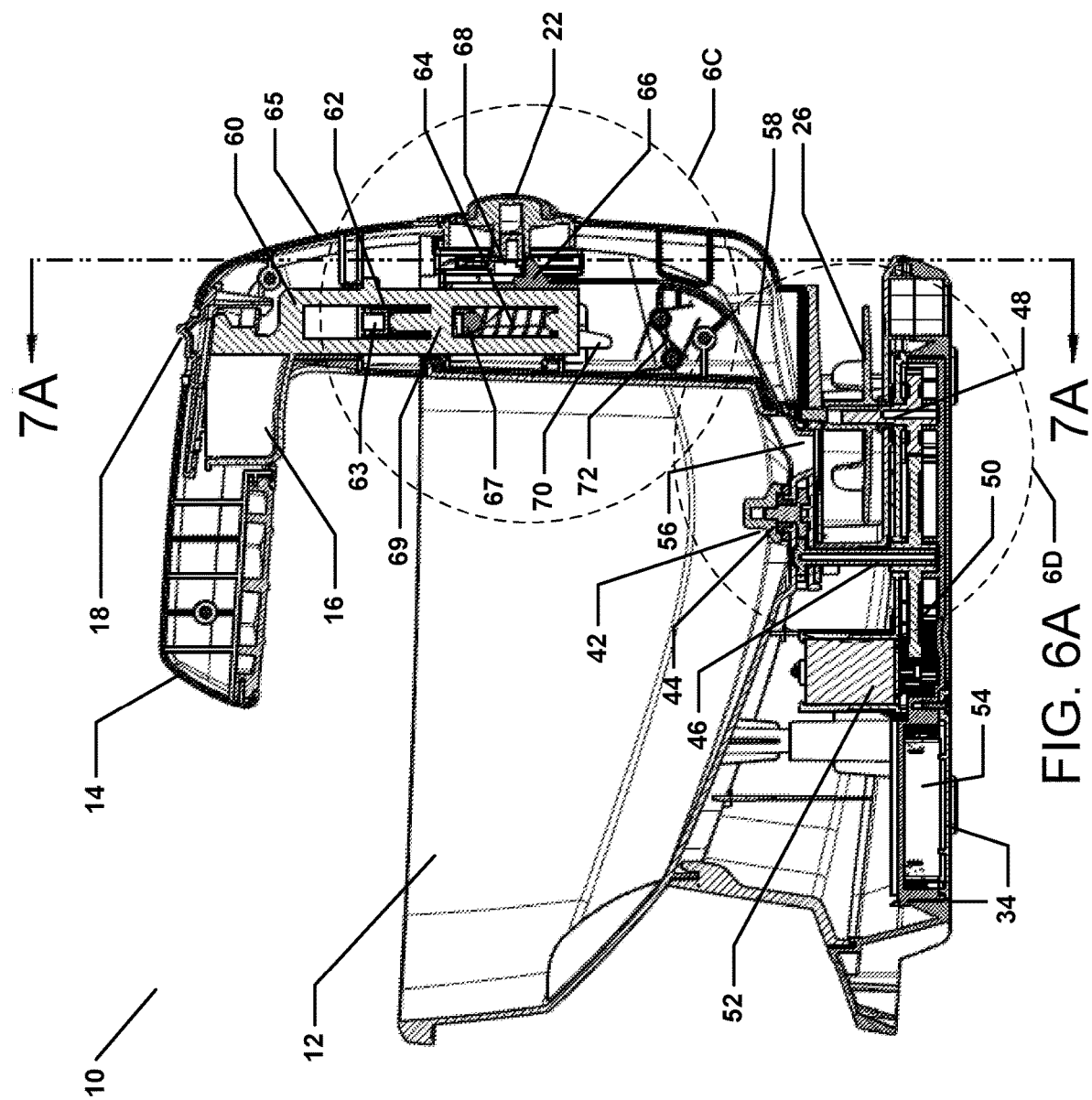
FIG. 6A depicts a cross sectional view taken along line 6A-6A of FIG. 5A according to exemplary embodiments.

In FIG. 6A, the shutter plate 58 is depicted in an open position. That is, the shutter plate 58 is retracted such that the hopper opening 56 is open to the rotor plate 26, which lies below it. The shutter plate 58, according to exemplary embodiments, is constructed of flexible plastic. For example, the shutter plate 58 may be constructed of polypropylene. Other suitable materials may be used.

Operation of the shutter plate 58 is controlled by a trigger mechanism 60. The trigger mechanism has a frame that is subdivided into two portions by an inner structural member 69. The trigger mechanism is coupled to the trigger 16 and moves with the trigger 16's movement. In FIG. 6A, the trigger 16 is depicted in a depressed state. The trigger lock 18 is not engaged. The depressed state depicted is an operational state in which the spreader is "on." The operation of the spreader is described further below. The trigger mechanism 60 is coupled to the shutter plate 58 such that movement of the trigger mechanism moves the shutter plate 58. The trigger mechanism 60, when moving from an "off" to an "on" position moves in an upward direction, coincident with the trigger movement, which retracts the shutter plate 58 from sealing or covering the hopper opening 56. The trigger mechanism 60 contains two springs mounted within its frame—an upper spring 62 located in the trigger mechanism's frame upper portion (above the inner structural member 69) and a lower spring 64 located in the trigger mechanism's frame lower portion (below the inner structural member 69). A stop 66 is connected to an internal part 67. The internal part 67 is held against the inner structural member 69 by the second spring 64. The stop 66 is configured to contact a cam 68 that is coupled to the shutter dial 22. Rotation of the shutter dial 22 causes a rotation of the cam 68. Changing position of the cam 68 changes at what point the stop 66 contacts the cam 68. Once the stop 66 contacts the cam 68, retraction of the shutter plate 58 stops. In this manner, the size of the opening of the hopper opening 56 through which granular material can flow can be altered during operation of the spreader device 10. It should be appreciated that the cam may be replaced by any other suitable structure in various embodiments. For example, a stop may be directly connected to the shutter dial such that it moves to various positions based on the dial setting.

The trigger mechanism 60 has a lower stop 70 that is configured to engage with an electrical contact set 72. The electrical contact set 72 is connected by electrical wires (not shown) to the motor 52. The lower stop 70 breaks electrical contact of the electrical contact set 72 when the trigger 16 in an "off" position. When the trigger 16 is in an "on" position, the lower stop 70, as depicted in FIG. 6A, is removed from breaking the electrical contact set 72, allowing for electrical flow for operation of the motor and hence operation of the spreader which includes rotation of the agitator 42 and the rotor plate 26 through rotation of the gear train 50. The electrical contact set 72 has one or more springs allowing for engagement of the contacts following the removal of the lower stop 70.

Figure 5A:
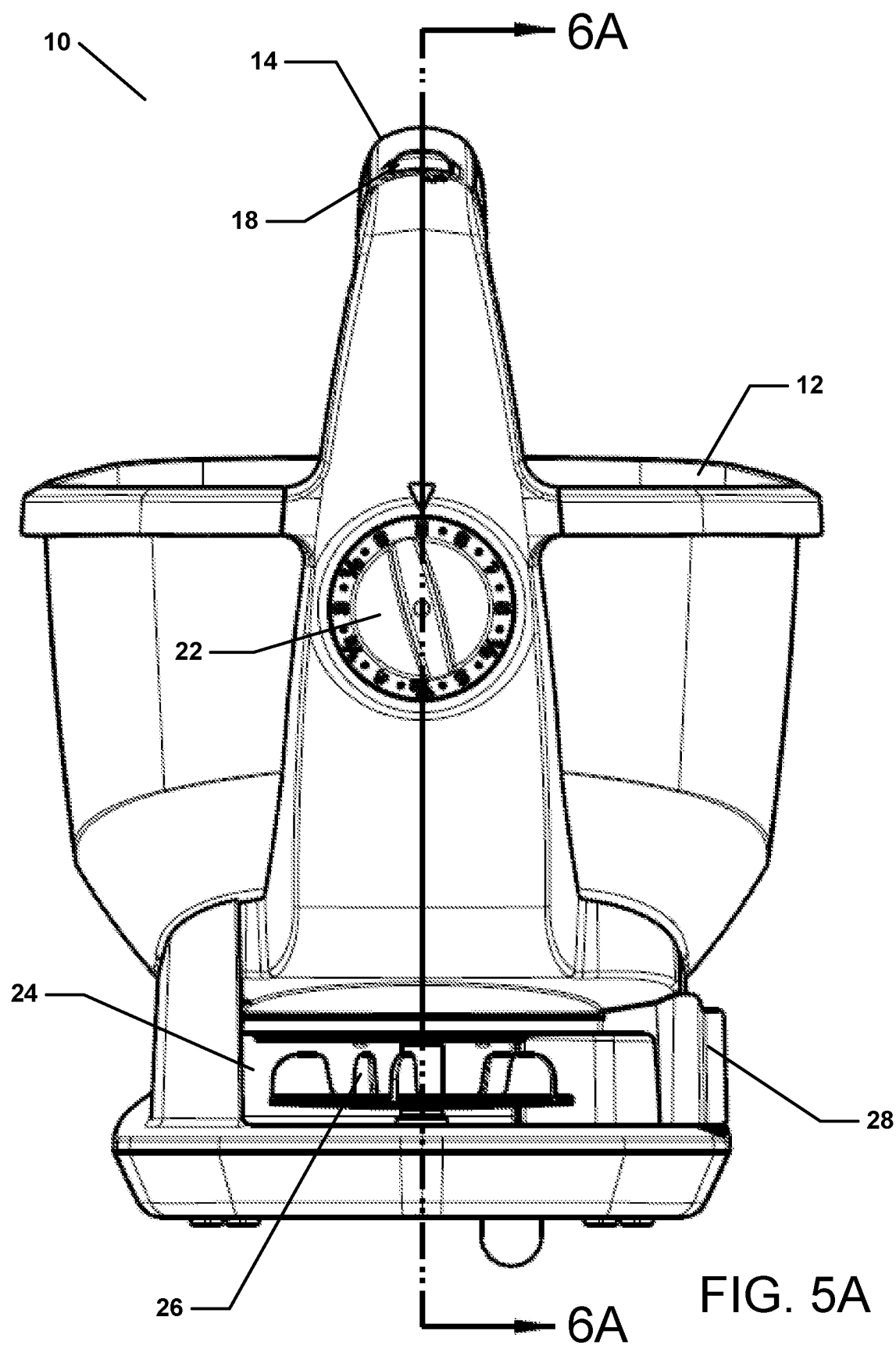
FIG. 5A depicts a front view of a powered hand-held spreader device with the shutter dial set to a maximum setting and the trigger depressed according to exemplary embodiments.
Figure 7A:
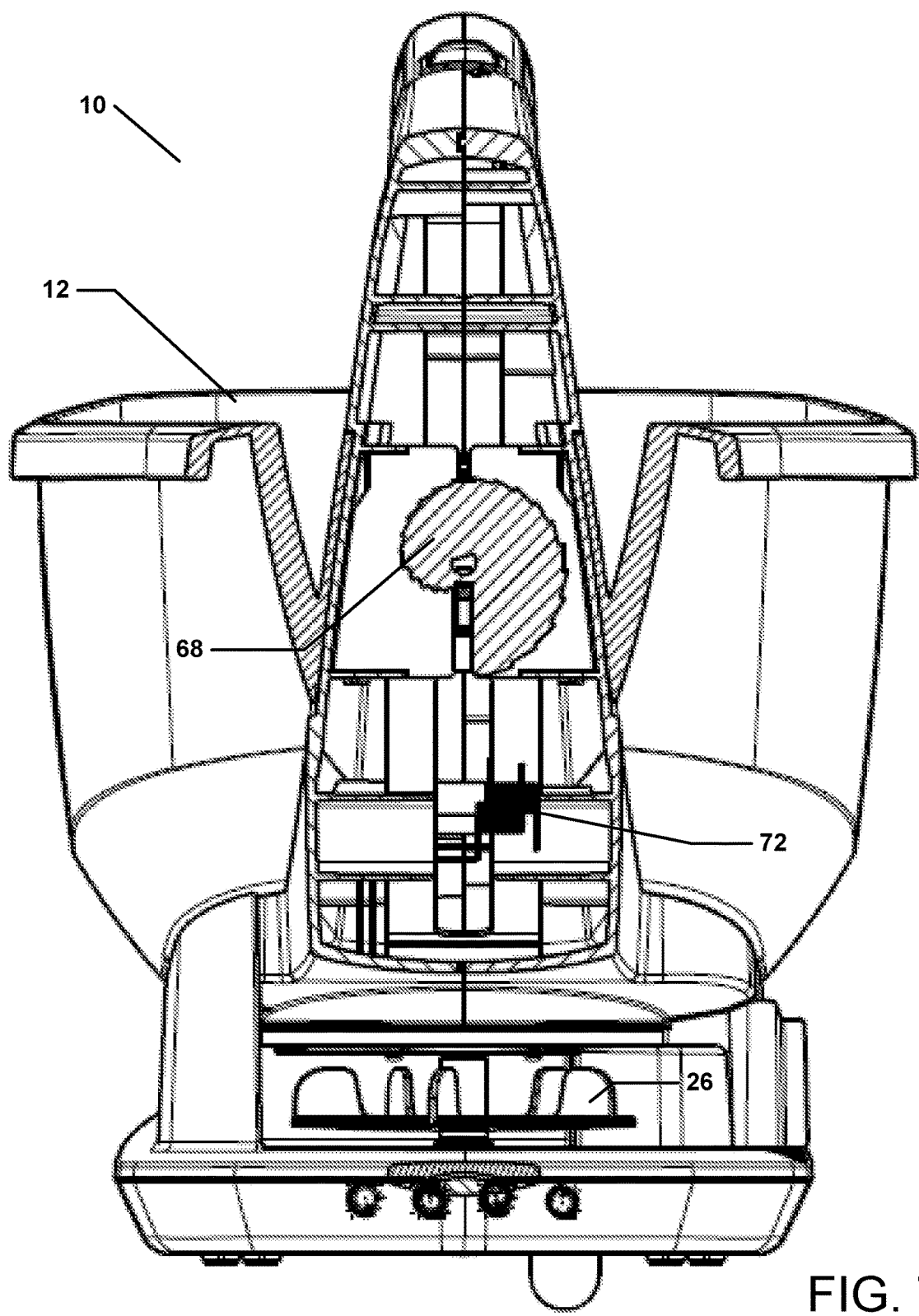
FIG. 7A depicts a cross sectional view taken along line 7A-7A of FIG. 6A according to exemplary embodiments.

FIGS. 6A and 7A depict the spreader device 10 with the shutter dial 22 and the cam set at the maximum setting. That is, the shutter plate 58, when retracted, retracts a maximum distance providing the largest opening size for the hopper opening 56. As depicted in FIG. 5A, the shutter dial 22 is set on 9, the maximum setting according to exemplary embodiments. The upper spring 62 is fully compressed and the lower spring 64 is not compressed or is minimally compressed. The upper spring 62 is fully compressed because the upper portion of the upper spring is attached to a projection 63 that is fixed to external shell 65 of the spreader body; that is, rather than the projection 63 being directly attached to the trigger mechanism 60, it is fixed to the shell 65 of the spreader body. This position represents the upper limit of travel for the trigger mechanism 60, the cam setting allowing the stop 66 maximum vertical movement upon depression of the trigger 16. The stop 66 is connected to the internal part 67 that has the lower spring 64 mounted thereto on its lower side. The internal part 67 rests upon the inner structural member 69 of the trigger mechanism but is not connected to the inner structural member 69. The lower spring 64 provides a force to hold the internal part 67 against the inner structural member 69 and cause the internal part 67 to move upward when the trigger 16 is depressed.

The upper spring 62 is attached at its upper end to the shell 65 of the spreader body and to the frame of the trigger mechanism 60 at its lower end. The lower end of the upper spring 62 is attached to the upper side of the inner structural member 69. Thus, the upper spring 62 compresses in response to upward movement of the trigger mechanism 60.

The lower spring 64 is attached at its upper end to the internal part 67 and at its lower end to frame of the trigger mechanism 60. The internal part 67 is not attached to the trigger mechanism 60 but held in position by the lower spring 64 against the inner structural member 69. The stop 66 is attached to the internal part 67. Once the stop 66 contacts the cam 68 during upward movement of the trigger mechanism 60, the internal part 67 (which is connected to the stop 66) stops upward movement and causes the lower spring 64 to compress as the trigger mechanism continues upward (since the internal part 67 is not connected to the trigger mechanism). The lower spring 64 compresses independent of the upper spring 62. FIGS. 6C and 6E depict partial views of the trigger mechanism and surrounding structure.

Figure 6B:
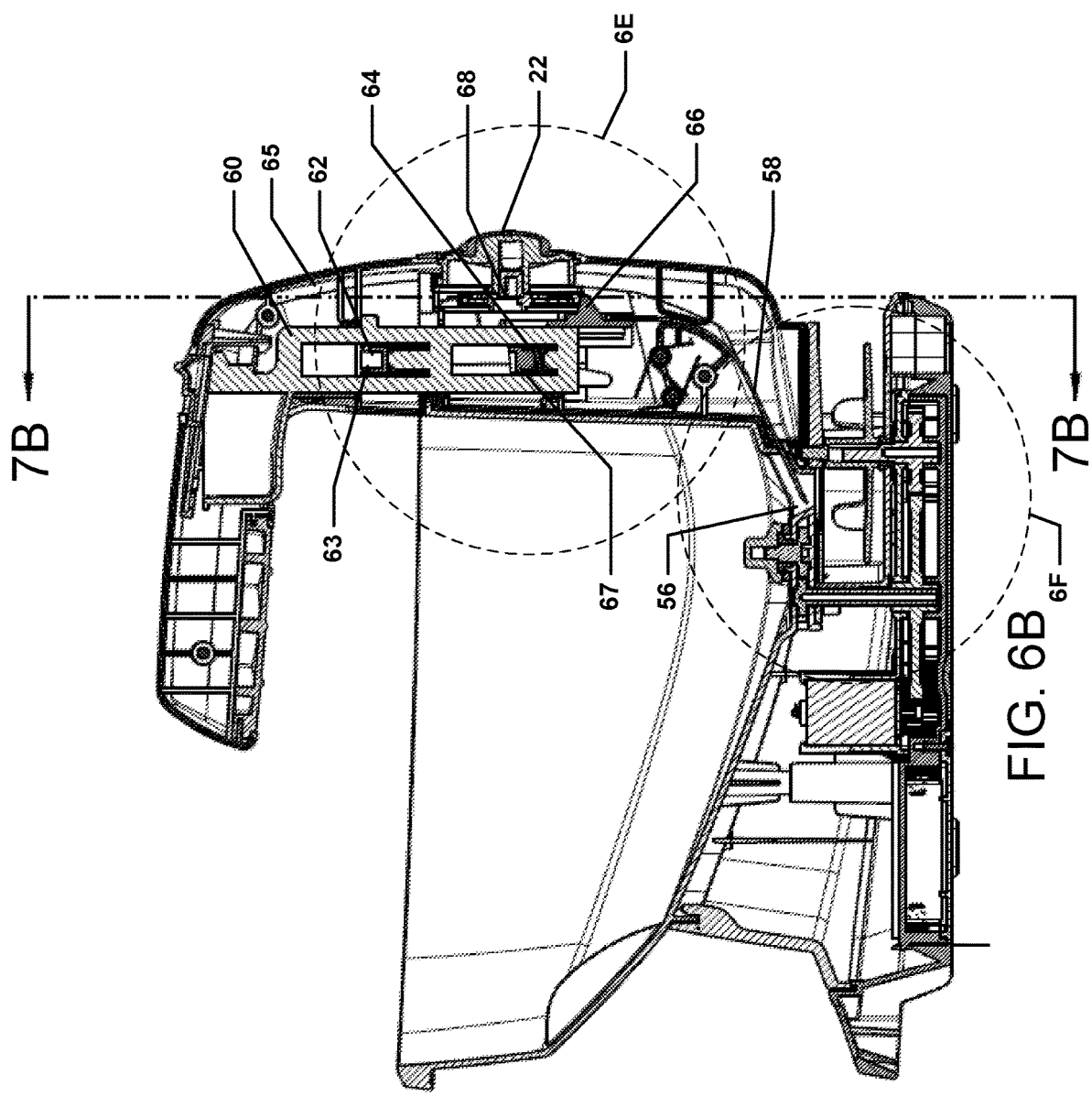
FIG. 6B depicts a cross sectional view taken along line 6B-6B of FIG. 5B according to exemplary embodiments.
Figure 6C:
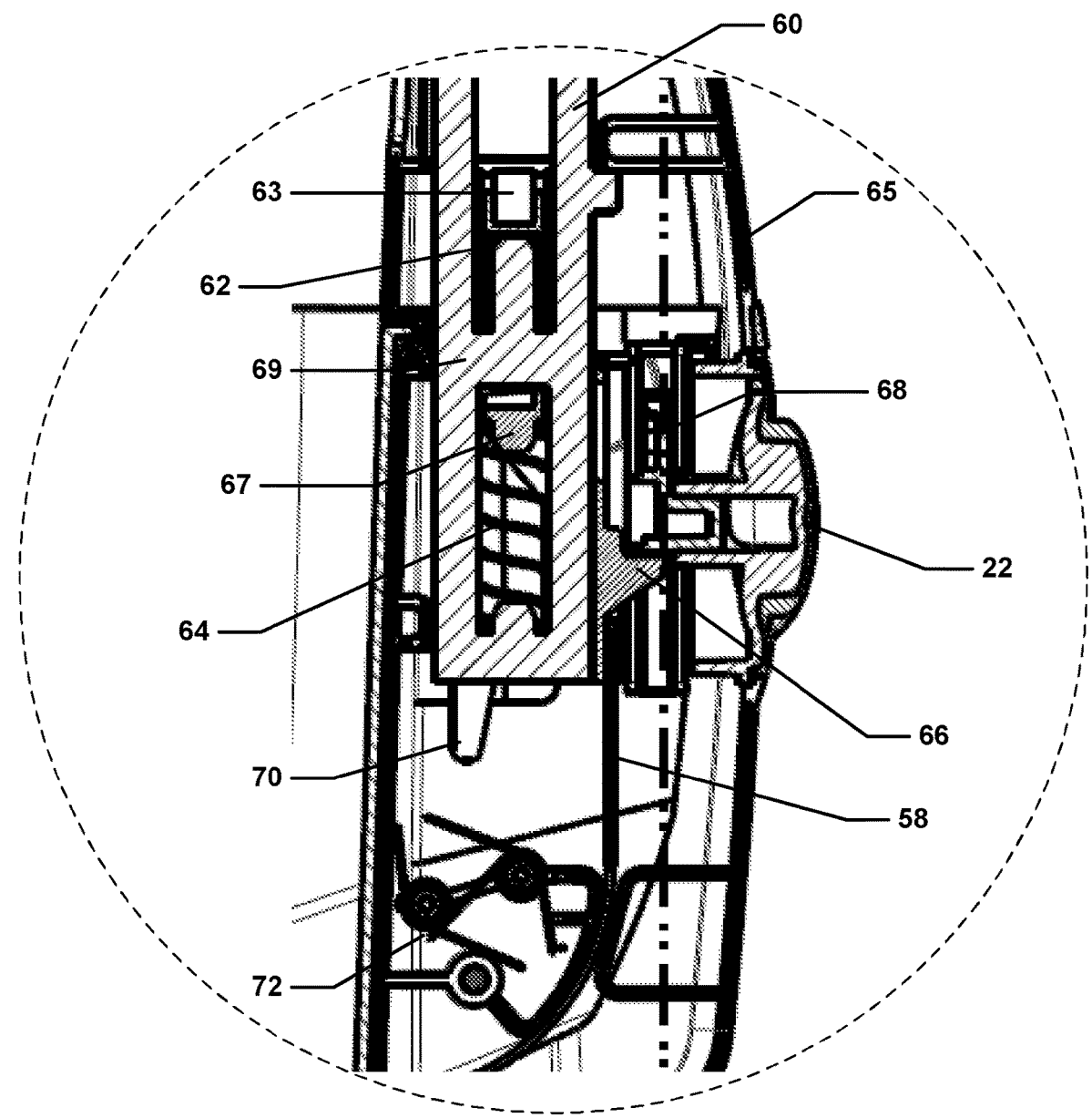
FIGS. 6C and 6D depict partial views of FIG. 6A according to exemplary embodiments.
Figure 6D:
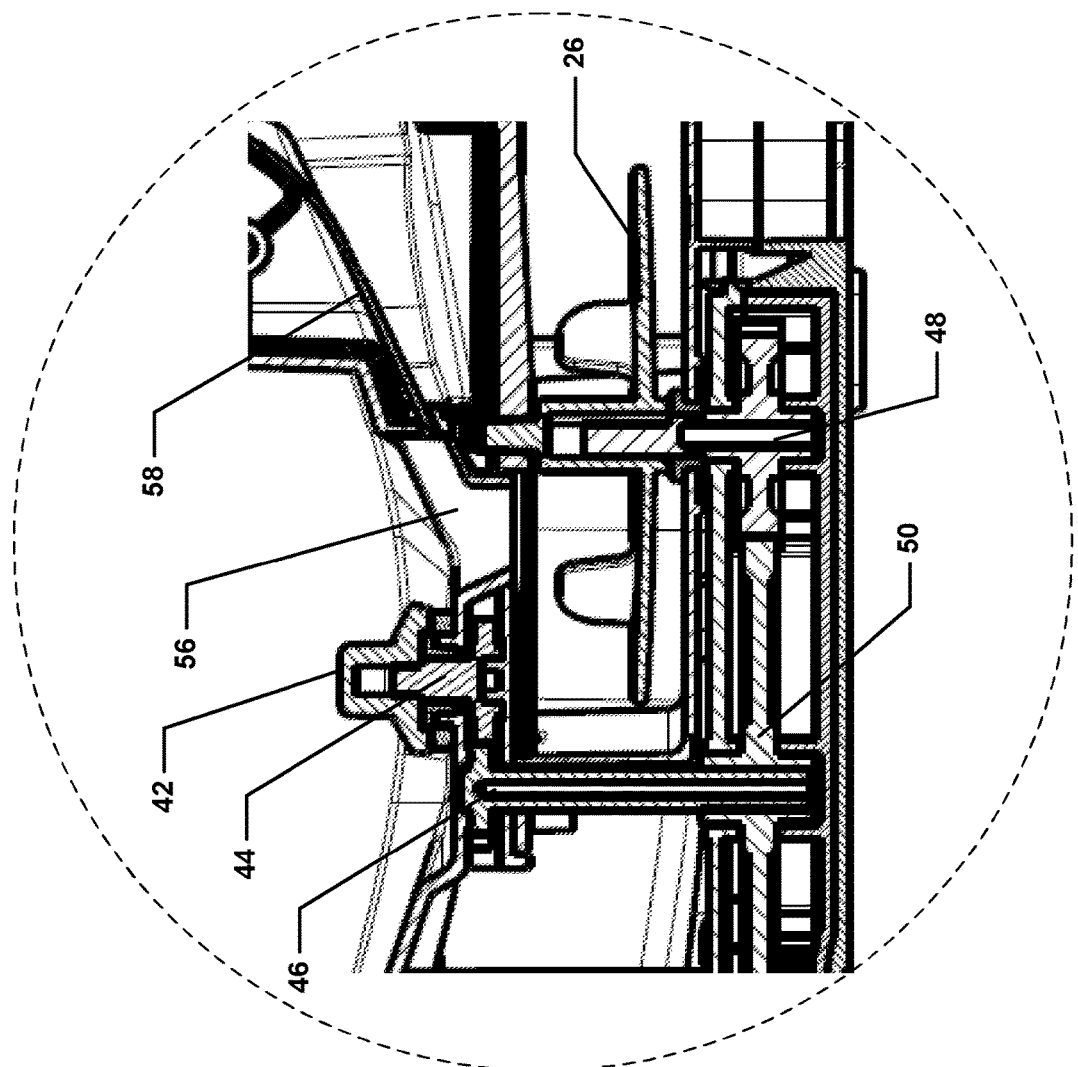
Figure 6E:
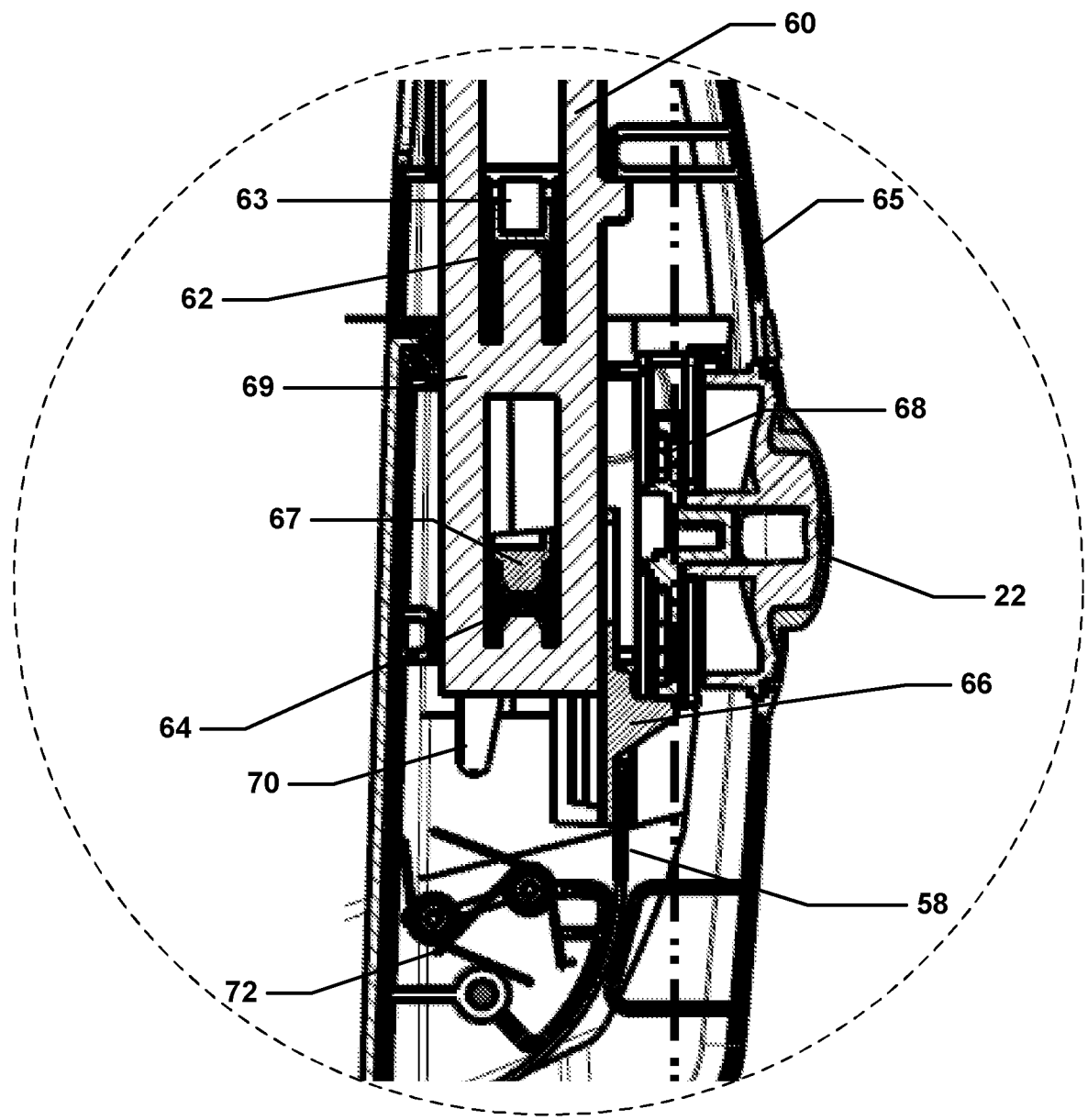
Figure 7B:
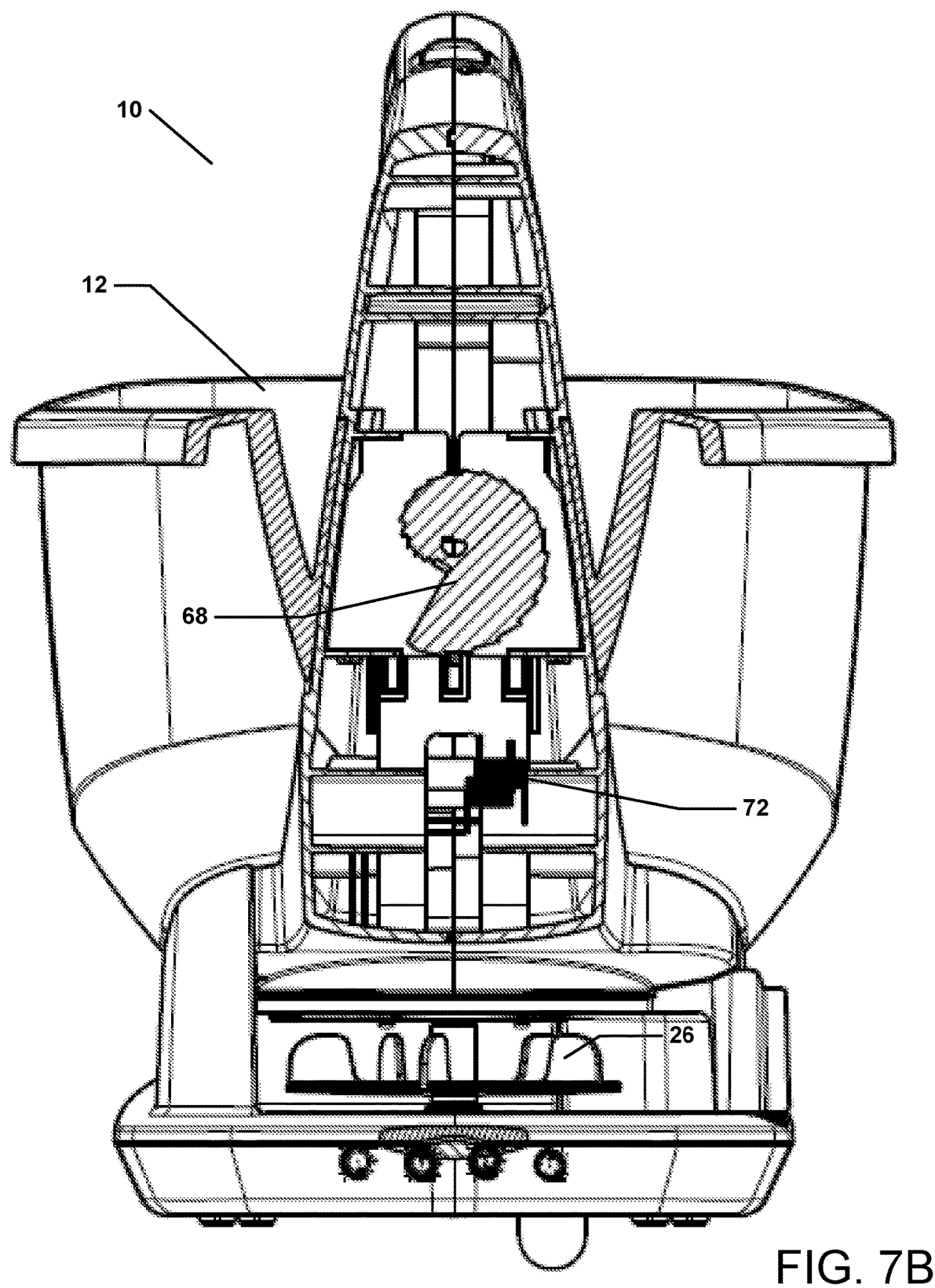
FIG. 7B depicts a cross-sectional view taken along line 7B-7B of FIG. 6B according to exemplary embodiments.

FIGS. 6B and 7B depict the spreader device 10 with the shutter dial 22 and the cam set at the minimum setting. That is, the shutter plate 58, when retracted, retracts a minimum distance providing the smallest opening for the hopper opening 56. As depicted in FIG. 5B, the shutter dial 22 is set on 2, the minimum setting according to exemplary embodiments. The upper spring 62 is fully compressed and the lower spring 64 is also fully compressed. The hopper opening 56 is smaller than that of FIG. 6A since the shutter plate 58 has retracted a minimal distance.

The stop 66 contacts the cam 68 at its lowest position at this setting. Contacting the stop 66 ceases retraction of the shutter plate 58. The stop 66, when engaged with the cam, causes the internal part 67 of the trigger mechanism 60 to stop upward movement which causes the lower spring 64 to compress, while at the same time allowing the trigger mechanism 60 to continue its upward movement. The internal part 67 is connected to the stop 66 such that when the stop 66 contacts the cam 68, the internal part 67 is stopped from further movement such that it separates from contact with the inner structural member 69. The internal part 67 therefore ceases upward movement, causing the lower spring 64 to compress as a result. It should be appreciated that cam settings between the maximum and the minimum will cause varying degrees of compression of the lower spring 64 based on the contact of the stop 66 with the cam. The trigger mechanism 60 continues its upward movement until it reaches its maximum point of travel. As depicted in FIG. 6B, the upper spring 62 is compressed to same amount as in the operational state depicted in FIG. 6A. FIGS. 6E and 6F depict partial views of the hopper opening area.

It should be appreciated that the trigger mechanism depicted is exemplary. Other configurations may be used in various embodiments. For example, the trigger mechanism may employ one spring or more than two springs. Other variations are possible.

FIGS. 8A, 8B, 9A, 9B, 10A, 10B, 11A, and 11B depict various internal views of a lower portion of the spreader device 10.

FIGS. 8A and 8B depict a lower portion 74 of the spreader device including the battery compartment 34, the batteries 54 and the gear train 50. The lower portion 74 is joined to an upper portion of the spreader device through a series of posts 76 (shown in FIG. 8A), through which screws (not shown) are inserted to secure this lower portion.

FIGS. 9A and 9B depict a second view of the lower portion 74. The motor 52 is mounted over the gear train 50 (not shown). The gear train 50 is contained in a gear train section that is covered as depicted. The drive shaft 46 extends upward for driving the agitator. An agitator drive or transfer gear 80 is mounted to the upper part of the drive shaft. The rotor shaft 48 is also depicted. An upper cover 78 and a lower cover 79 contain the gear train. The gear train 50 may be enclosed to protect the gear train from dust and other particulate matter.

FIGS. 10A and 10B depict a third view of the lower portion 74. The agitator transfer gear 80 meshes with an agitator gear 82 that is connected to the agitator shaft 44. The rotor plate 26 is mounted to the rotor shaft 48.

FIGS. 11A and 11B depict a fourth view of the lower portion 74. The agitator 42 is mounted to the agitator shaft 44. The agitator 42 has a single arm or blade. The agitator 42 may have a curved blade that is optimized for use in various granular material types used with the spreader device. In various embodiments, the agitator 42 may have two arms or blades. Other agitator configurations are possible and may be optimized for use with various granular material types. In various embodiments, the agitator 42 may be changeable to allow for use of different agitator types and configurations based on the type of granular material.

The agitator 42 sits upon a washer 84. The washer 84 prevents moisture, dirt, and granular material from entering the gear train area of the lower portion. In exemplary embodiments, a wool washer is used. Other washer types can be used in various embodiments. The washer 84 may be located between the agitator and the floor of the hopper in which the agitator is mounted. The washer may also be located below the floor of the hopper, above the agitator gear 82.

Referring back to FIGS. 8A and 8B, the gear train 50 will be described. The motor 52's output shaft is coupled to a motor pinion 86. The motor pinion 86 is meshed with an idler gear 88. Mounted to the idler gear 88 is a pinion 90 that drives an intermediate gear 92. The intermediate gear 92 drives the rotor plate pinion 94. The rotor plate pinion 94 has the rotor shaft 48 mounted thereto. Also, the intermediate gear 92 has the drive shaft 46 mounted thereto, which is mounted to the intermediate gear 92 (the base of which is depicted in FIGS. 8A and 8B).

Figure 12A:
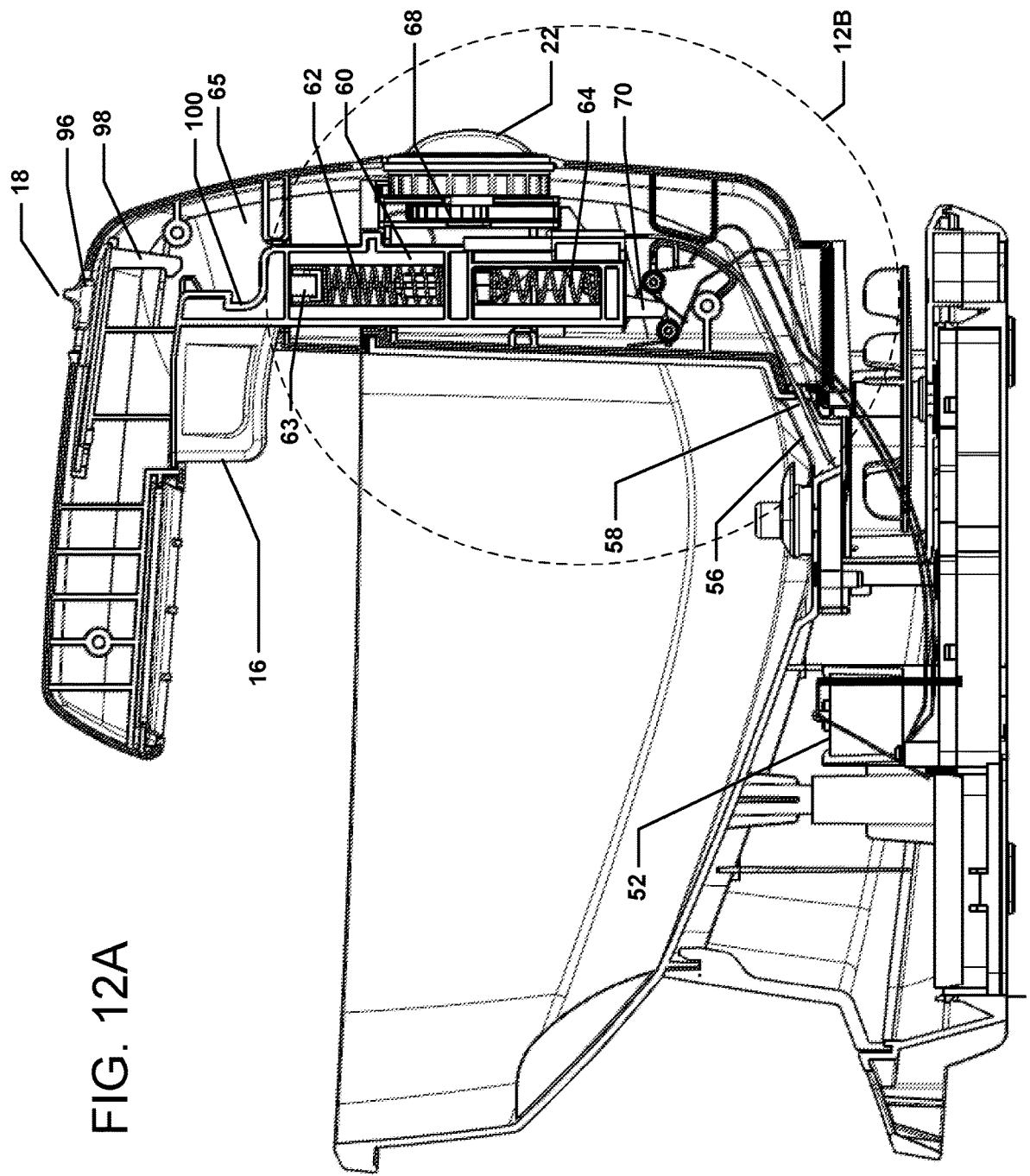
FIG. 12A depicts a cut-away view of a powered hand-held spreader device in an "off" state according to exemplary embodiments.
Figure 12B:
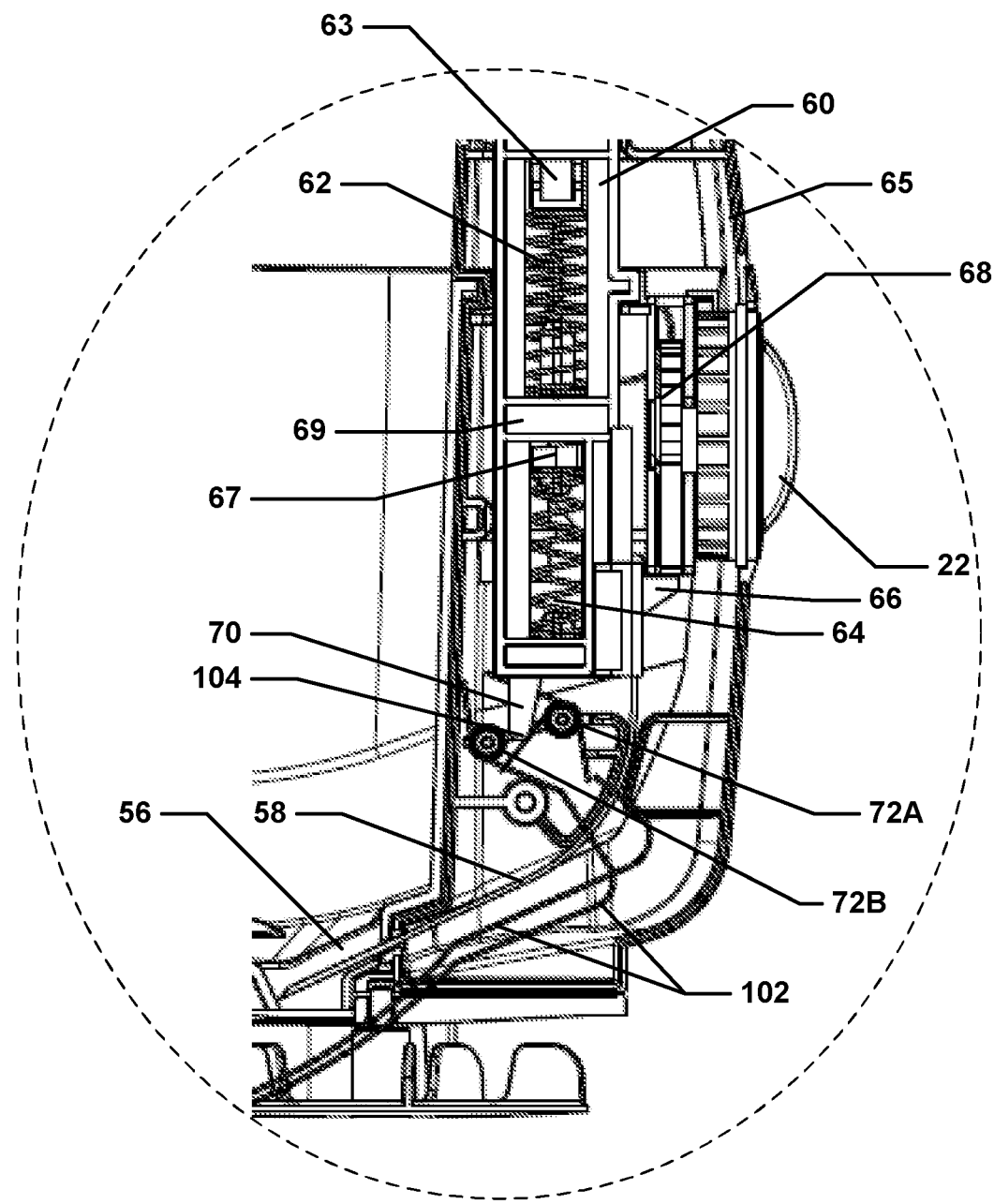
FIG. 12B depicts a partial view of FIG. 12A according to exemplary embodiments.
Figure 13:
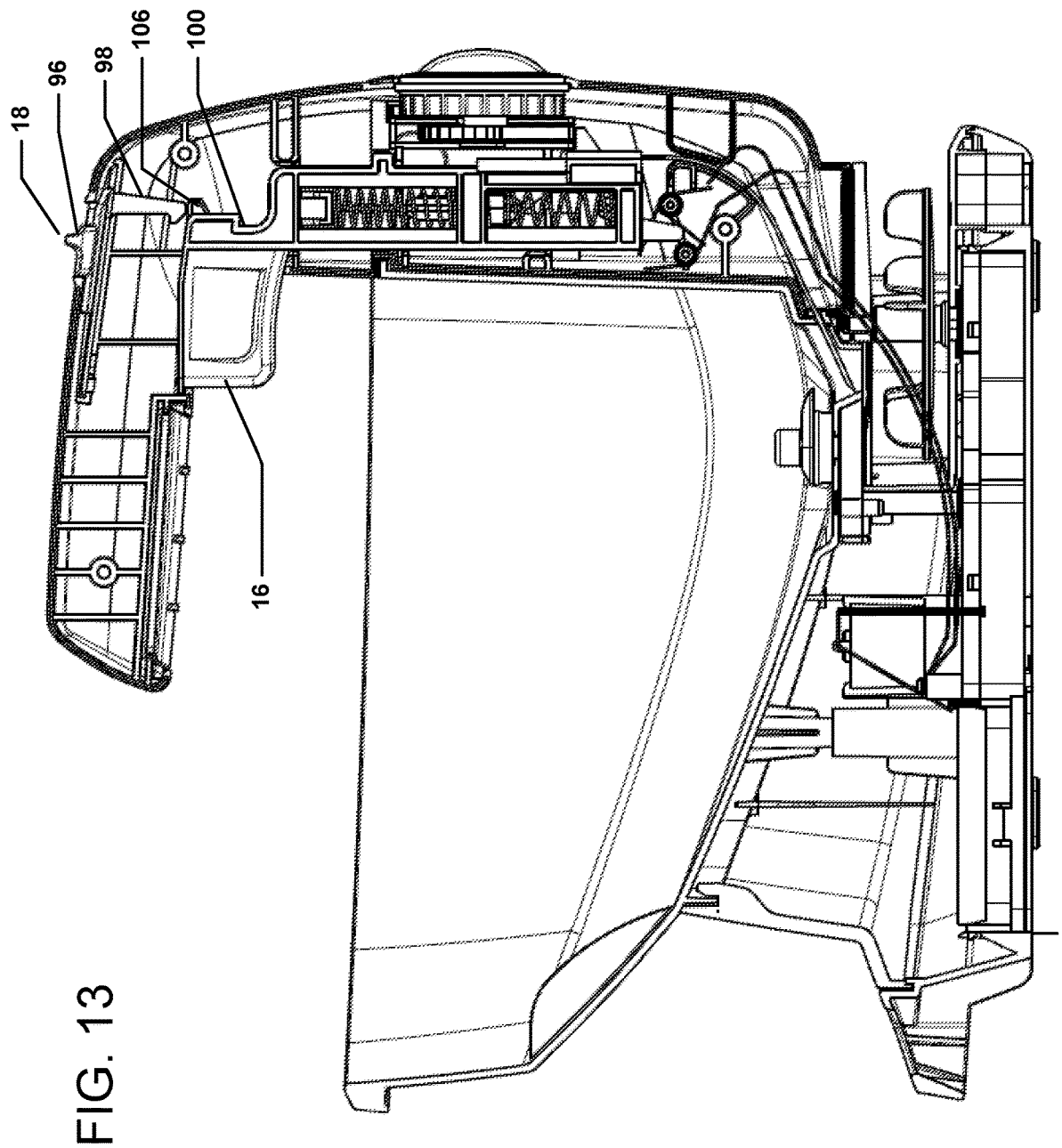
FIG. 13 depicts a second cut-away view of a powered hand-held spreader device in an "off" state according to exemplary embodiments.

FIGS. 12 through 15 depict different operational states of the spreader device according to exemplary embodiments. In FIGS. 12A and 12B, the trigger is off, the trigger lock is off, and the motor is off. In FIG. 13, the trigger is off, the trigger lock is on, and the motor is off. In FIG. 14A, the trigger is on, the trigger lock is off, and the motor is on. Finally, in FIG. 15, the trigger is on, the trigger lock is on, and the motor is on.

Referring to FIGS. 12A and 12B, the trigger 16 in the "off" or not depressed position. This is the default position for the trigger 16. The trigger lock 18 is off also. The trigger lock 18 has a switch 96 and a latch 98. The latch 98 is configured to match with a recess and lip 100 on the trigger 16. The trigger mechanism 60 as previously described has an upper spring 62 and a lower spring 64. These springs provide tension for operation of the trigger. The upper spring 62 provides for return of the trigger mechanism to the off position. In the off position, both springs are in an unloaded state.

In the off position, the lower stop 70 breaks the electrical contact set 72 by moving a contact portion downward and distal from one of the contacts of the set. The electrical contact set 72 may have two contacts: 72A and B. Each of the contacts is connected to the motor 52 by a wire 102. The stop 70 moves a wire spring portion 104 of the contact 72A out of contact with the contact 72B, breaking the electrical circuit. Hence, in the position shown, the motor 52 is off.

In the "off" position, the shutter plate 58 is closed, sealing the hopper opening 56. Material in the hopper is unable to exit the spreader device.

Referring to FIG. 13, the trigger lock 18 is engaged. The trigger lock 18 can be used to prevent actuation of the spreader device by holding the trigger 16 in the off position. The trigger lock 18 is engaged by moving the switch 96 towards the rear of the handle. This movement causes the latch 98 to move to a position over a stop portion 106 of the trigger 16 as depicted. The trigger 16 is not able to be depressed in this configuration since the latch 98 prevents upward movement of the trigger through contact with the stop portion 106.

Figure 14A:
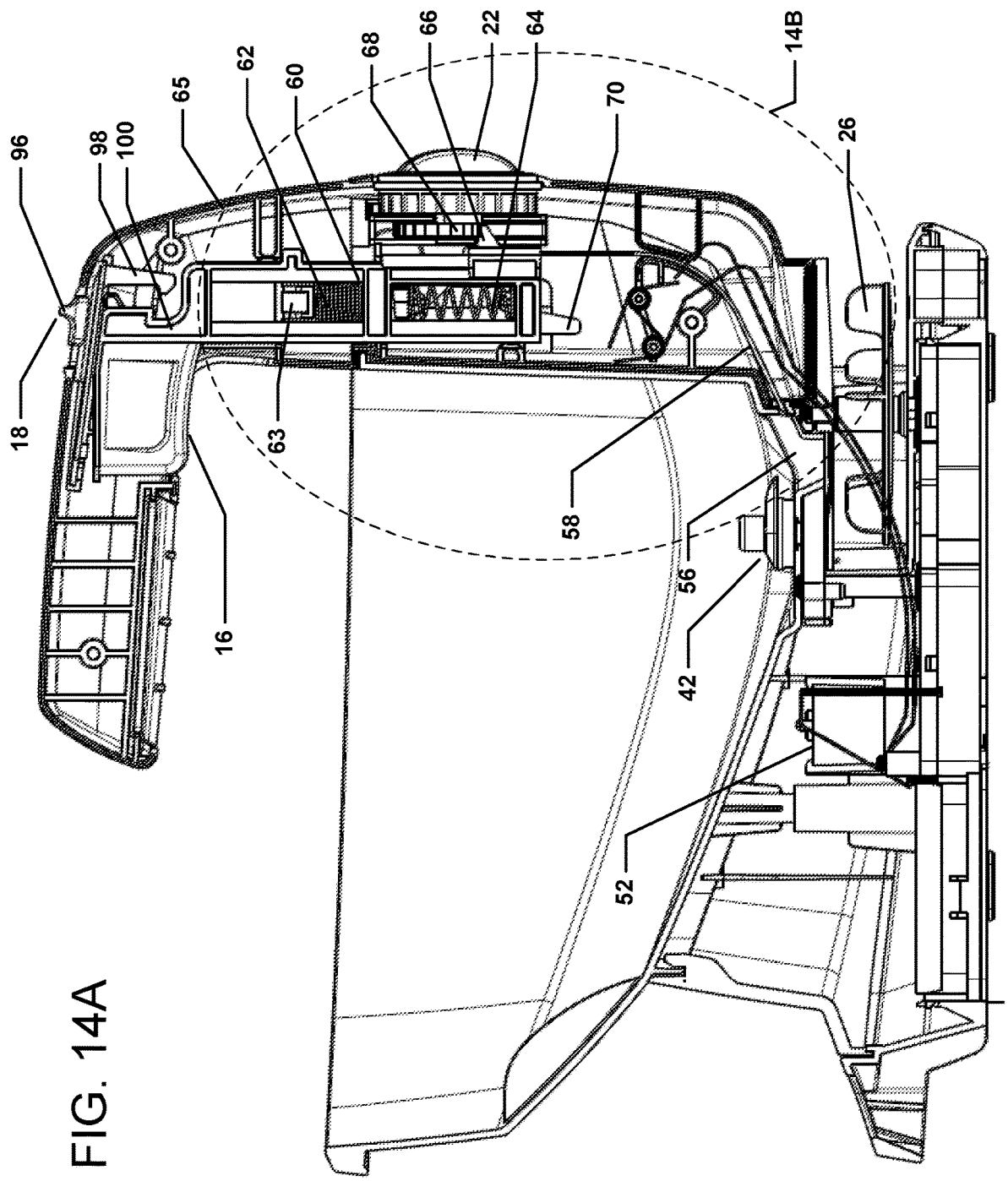
FIG. 14A depicts a cut-away view of a powered hand-held spreader device in an "on" state according to exemplary embodiments.
Figure 14B:
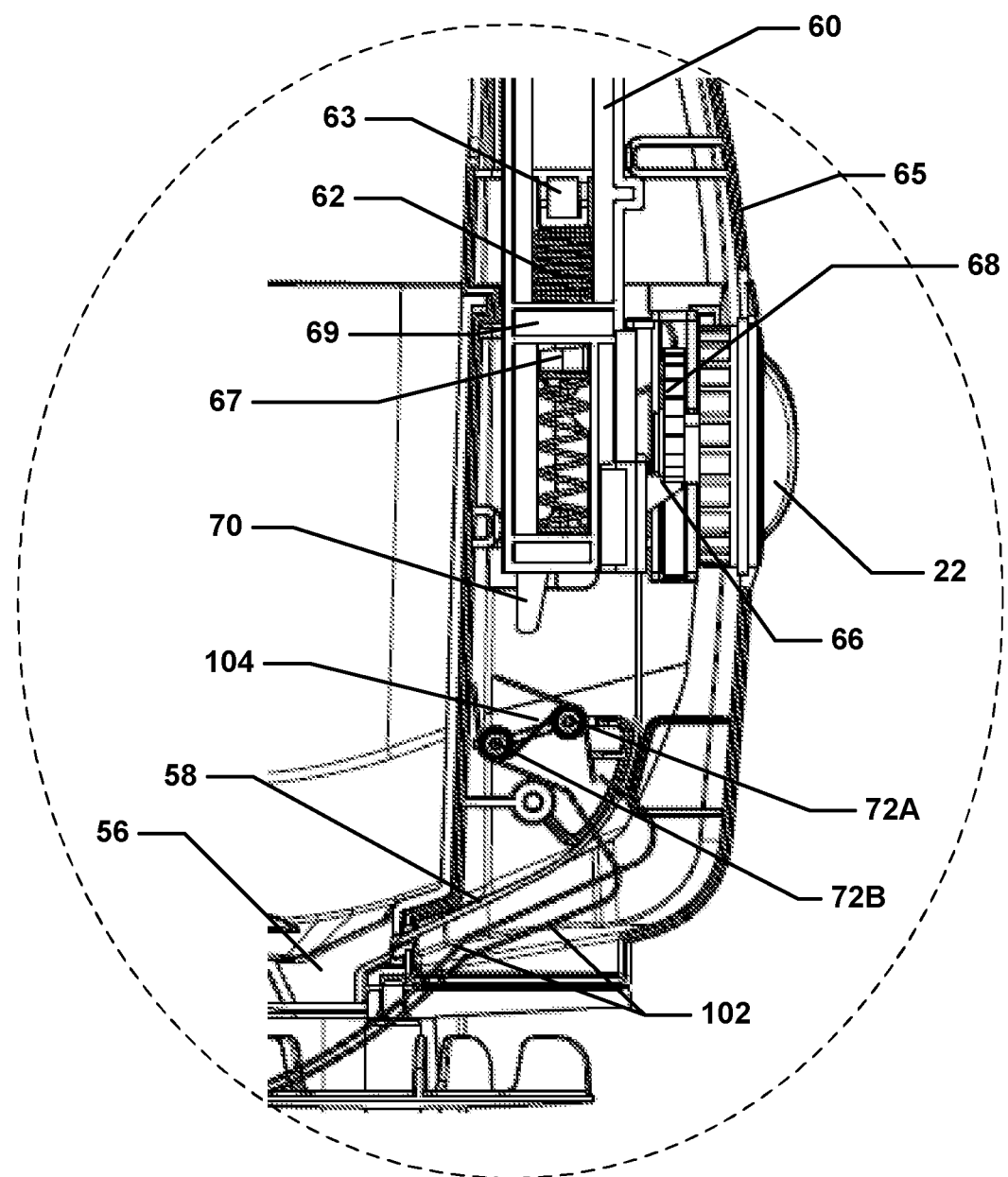
FIG. 14B depicts a partial view of FIG. 14A according to exemplary embodiments.

Referring to FIGS. 14A and 14B, the trigger 16 is in the "on" or depressed position. The trigger lock 18 is off also. The trigger mechanism 60 is moved upward for its off position. The upper spring 62 is compressed as depicted from the upward movement of the trigger mechanism. The lower spring 64 is not compressed in this position. The stop 66 of the trigger mechanism has contacted the cam 68.

The lower stop 70 has moved upward allowing the wire spring portion 104 of the contact 72A to return to contact with the contact 72B, completing the electrical circuit. Hence, in the position shown, the motor 52 is on. Since the motor 52 is on, the gear train is being driven and hence the rotor plate 26 would be spinning as would the agitator 42.

The shutter plate 58 is open, unsealing the hopper opening 56. Material in the hopper is able to exit the spreader device and fall onto the spinning rotor plate and therefore be ejected from the spreader device to be spread over a surface.

Figure 15:
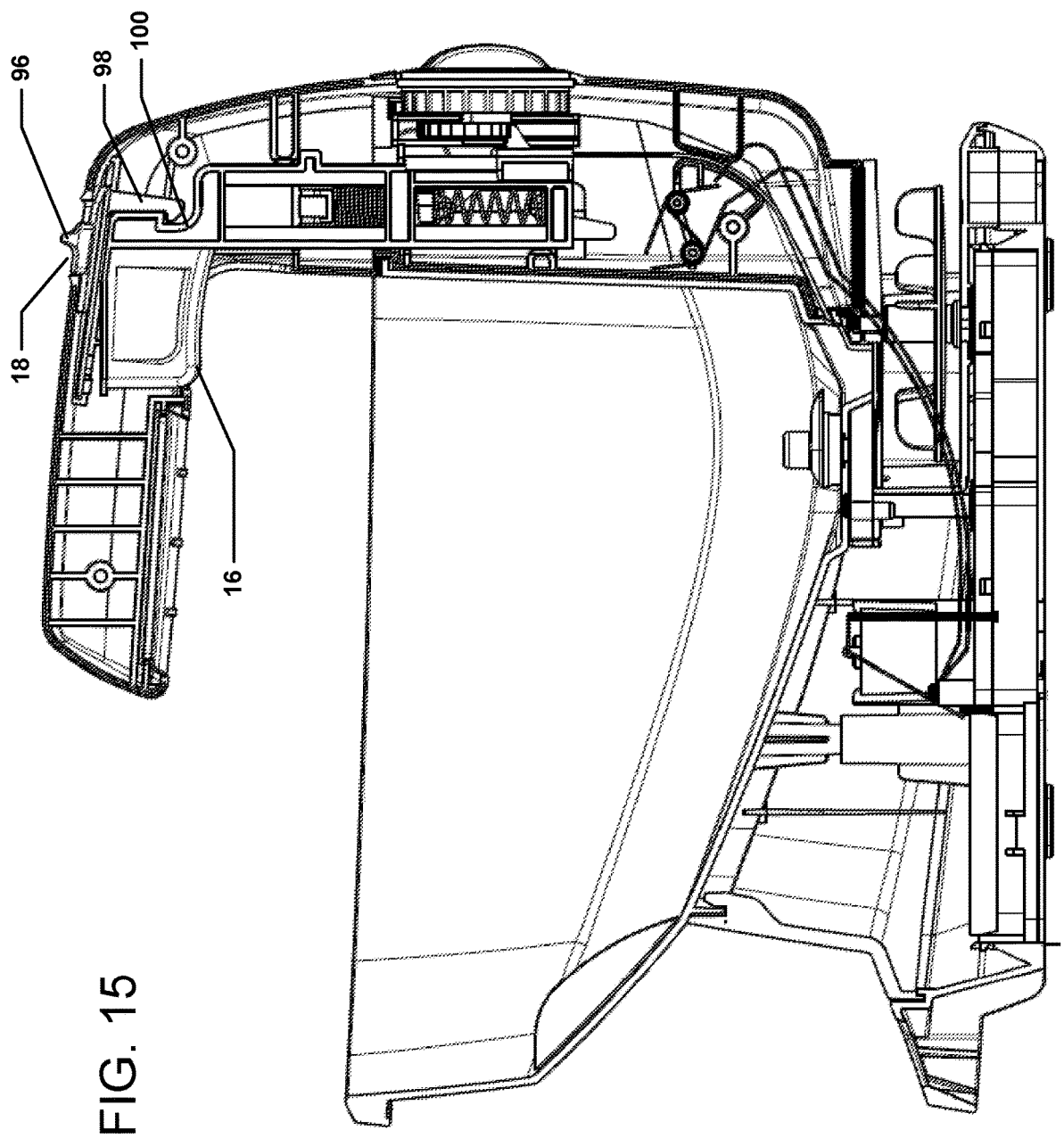
FIG. 15 depicts a second cut-away view of a powered hand-held spreader device in an "on" state according to exemplary embodiments.

Referring to FIG. 15, the trigger lock 18 is engaged. The trigger lock 18 can be engaged to hold the trigger 16 in the "on" position. The trigger lock 18 is engaged by moving the switch 96 towards the rear of the handle. This movement causes the latch 98 to move to a position under the lip in the recess 100. The trigger 16 remains in the on or depressed position in this configuration since the latch 98 prevents downward movement of the trigger through contact with the lip 100.

In various embodiments, the trigger lock 18 may have different configurations. For example, the trigger lock 18 may be configured for engagement in either the "off" or "on" positions. In various embodiments, the trigger lock 18 may automatically engage the trigger in the "on" position or when the trigger is fully depressed. The trigger lock 18 may be tensioned with a spring or other structure to automatically engage the trigger. The trigger lock 18 may be optional.

Figure 16B:
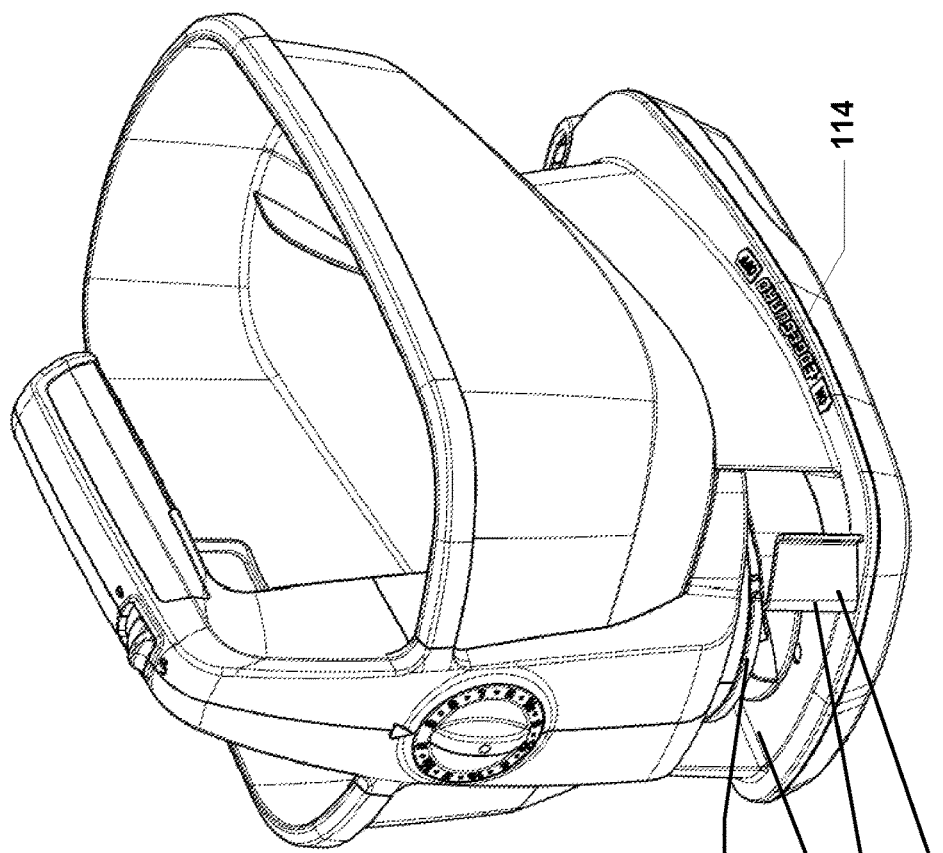
FIGS. 16A and 16B depict operation of the adjustable side deflector feature according to exemplary embodiments.
Figure 16A:
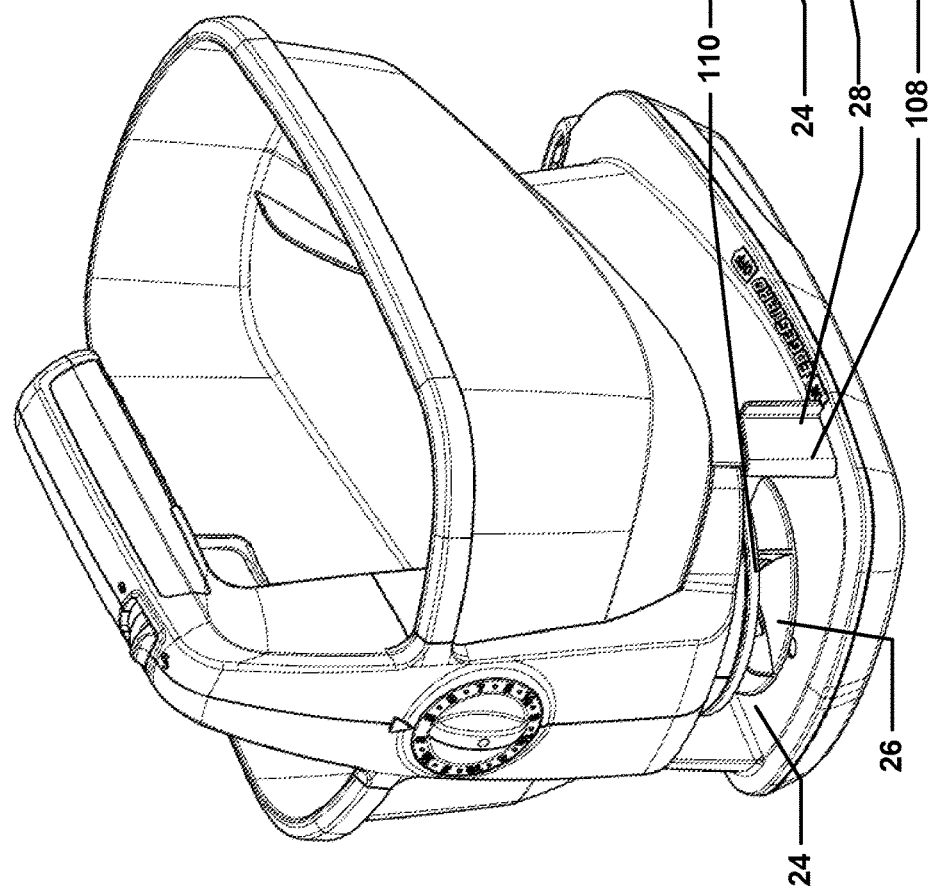

As described above, the spreader device may have an adjustable side deflector 28 which can be optionally engaged to alter the spreading pattern. The adjustable side deflector 28 may be an optional feature in various embodiments. In operation, the adjustable side deflector 28 is manually moved from a stored position to an actuated position. The adjustable side deflector 28 may block the spreading of the spreadable or granular material on one side of the rotor plate by narrowing the spreading pattern. The adjustable side deflector can be rotated back to its stowed position when desired. FIGS. 16A, 16B, 17A, and 17B depict the operational states of the adjustable side deflector 28. FIGS. 16A and 17A depict the adjustable side deflector in the "off" position. FIGS. 16B and 17B depict the adjustable side deflector in the "on" position.

The adjustable side deflector 28 consists of a tab 108 and a ring 110. The tab 108 and ring 110 are connected, such that movement of the tab 108 moves the ring 110. The ring 110 is mounted over the rotor plate center post 112 which allows rotation from "off" to "on." As can be seen in FIGS. 16B and 17B, movement of the tab 108 causes a narrowing of the opening 24, which in turn allows for a narrower dispersal pattern of the granular material during operation of the spreader device. Material is not able to be spread past the adjustable side deflector 28. Additionally, the ring 110 partially blocks the hopper opening 56 when the adjustable side deflector 28 is on, which restricts output of the granular material onto the rotor plate.

The spreader device may have a label 114 to indicate the status of the adjustable side deflector 28. That is, the label may have "off" and "on" labels with arrows that correspond to the position of the tab 108 as depicted in FIG. 16B, for example. It should be appreciated that the label 114 is exemplary and other labels are possible.

A stop 116 is located at the internal end of the tab. The stop 116 mates with a corresponding structure on the spreader body to provide a limit when the adjustable side deflector 28 is placed into the "off" position. The stop 116 has a projection 118 that provides a limit when the adjustable side deflector 28 is moved to the "on" position. The projection 118 hits an internal wall of the spreader body preventing further rotation of the adjustable side deflector 28. The ring 110 has a detent bump 120 that fits into a corresponding recess 122 in the spreader body to provide a limit for the "position" and to hold the adjustable side deflector 28 in the "off" position. When in the "on" position, the detent bump 120 fits into a second recess 124 to provide a limit for the "on" position and to hold the adjustable side deflector 28 in the "on" position. The detent/recess structure provides feedback to a user when the adjustable side deflector 28 is in the proper position.

Figure 18:
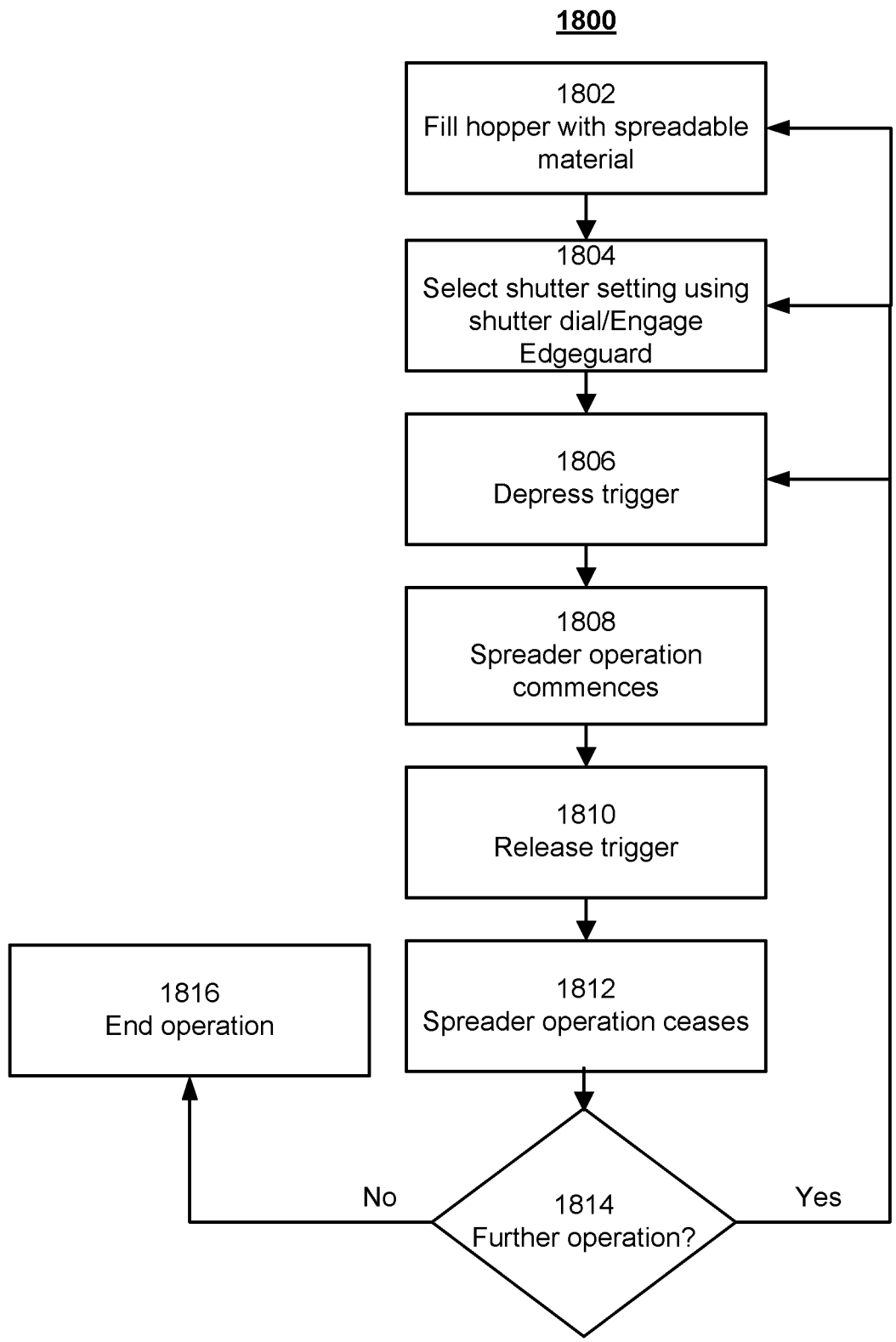
FIG. 18 depicts a flow chart of a method of operating a powered hand-held spreader device according to exemplary embodiments.

FIG. 18 depicts a flow chart of a method 1800 of operating the spreader device. This method is exemplary as there are a variety of ways to carry out the present disclosure. Each block shown in the method represents one or more processes or decisions carried out in the exemplary method, and these processes or decisions are not necessarily carried out in the specific order outlined in the method, nor may be each required.

First, at 1802, the hopper is filled with spreadable material. Next, at 1804, a setting on the shutter dial is selected. Also, at 1804, the adjustable side deflector can be engaged (if so equipped). At 1806, the trigger can then be depressed to begin operation of the spreader device when the user is ready. At 1808, spreader operation commences. A number of events occur in the spreader device.

Depression of the trigger causes retraction of the shutter from the hopper opening. The shutter is retracted a distance corresponding to the setting on the shutter dial. The shutter cam coupled to the shutter dial stops upward movement of the trigger mechanism, which in turn stops retraction of the shutter plate. During a first phase of upward movement of the trigger mechanism, an upper spring is compressed until a stop on the trigger mechanism contacts the shutter cam. Compression of the upper spring ceases when the trigger mechanism reaches its upper limit of travel, and a lower spring is compressed based on the stop contacting the shutter cam.

The upward movement of the trigger mechanism also allows for contact between certain electrical connections, causing actuation of the motor. Actuation of the motor causes rotation of the gear train. The motor is a constant speed motor. The rotation of the gear train causes rotation of the agitator in the hopper and the rotor plate through connected shafts. In operation, the spreadable material can flow from the hopper, agitated by the agitator, through the hopper opening, at a rate permitted by the shutter plate opening, and then impact the spinning rotor plate, which causes the spreadable material to be ejected from the spreader device and spread over the desired terrain.

At 1810, upon completion of the desired spreading, the trigger is released. At 1812, spreader operation ceases. Upon release, the trigger mechanism moves downward. The springs cause return of the trigger mechanism to its initial position. Electrical contact is broken by the trigger mechanism causing the motor to cease operation, which in turn causes the gear train to stop moving. The agitator and rotor plate cease movement. The downward movement of the trigger mechanism also cause the shutter to move back over the hopper opening, sealing the hopper opening and thus cutting off the flow of spreadable material from the hopper.

At 1814, the method 1800 may be repeated, as required, by returning to 1802 to refill the hopper or to fill with a different material, by returning to 1804 to change the shutter setting, and/or by returning to 1806 by depressing the trigger again. If no further operation is desired, the method 1800 ceases at 1816.

During operation, the trigger lock can optionally be applied using a switch located at the top portion of the handle. The trigger lock secures the trigger in the "on" position allowing for continual operation of the spreader without application of any pressure on the trigger. The trigger lock can also be applied, using the same switch, with the trigger in the "off" position. The trigger lock prevents movement of the trigger in this position which prohibits actuation of the spreader device. When the trigger lock is not engaged, the trigger can be actuated freely.

Accordingly, the various embodiments are not to be limited in scope by the specific embodiments described herein. Further, although some of the embodiments have been described herein in the context of a particular implementation in a particular environment for a particular purpose, those of ordinary skill in the art should recognize that its usefulness is not limited thereto and that the various embodiments can be beneficially implemented in any number of environments for any number of purposes. Accordingly, the claims set forth below should be construed in view of the full breadth and spirit of the embodiments as disclosed herein. While the foregoing description includes many details and specificities, it is to be understood that these have been included for purposes of explanation only, and are not to be interpreted as limitations of the various embodiments. Many modifications to the embodiments described above can be made without departing from the spirit and scope of this description.

The invention claimed is:

1. A portable device suitable for spreading granular product, comprising:
    a spreader body, comprising:
        a hopper, comprising an open upper portion and an internal volume configured to contain an amount of granular product for spreading over terrain or other surfaces, and further comprising an outlet located at a bottom portion of the hopper;
        a handle integral to the spreader body;
        a motor disposed in a lower portion of the spreader body, below the hopper;
        a gear train driven by the motor;
        an opening located on a forward portion of the spreader body;
        a rotor plate for spreading the granular product located in the opening below the outlet and driven by the gear train through a first shaft;
        an agitator mounted in the hopper, proximate the outlet, and driven by the gear train through a second shaft;
        a trigger, mounted in the handle, that is movable between a first position in which the motor is off and a second position in which the motor is actuated, the trigger configured to default to the first position, the trigger being operably coupled to a trigger mechanism;
        a rotary dial, coupled to the forward portion of the spreader body below the handle, the rotary dial being rotatably movable between a plurality of settings;
        a shutter cam, coupled internally to the rotary dial, for adjusting a distance of travel of a shutter plate, that is located proximal to the outlet, based on a selected setting of the rotary dial; and
        the shutter plate being coupled to the shutter cam and being movable with respect to the outlet, the shutter plate being movable such that when the trigger is in the first position the shutter plate covers the outlet and when the trigger is in the second position, the shutter plate is retracted and uncovers the outlet, traveling a distance based on the selected setting of the rotary dial through movement of the trigger mechanism.

2. The portable device according to claim 1, wherein the handle is facing rearward over the hopper such that the handle overhangs the hopper.

3. The portable device according to claim 1, wherein the handle is integral to a forward portion of the spreader body.

4. The portable device according to claim 1, wherein the granular product comprises ice melting granules, fertilizer, pesticides, granular soil amendment material, granular oil absorbent material, dusting products, granular floor cleaning product, grass seed, or combinations thereof.

5. The portable device according to claim 1, wherein the motor is powered by a power source comprising one or more batteries.

6. The portable device according to claim 1, wherein the agitator comprises a single blade.

7. The portable device according to claim 6, wherein the single blade is curved.

8. The portable device according to claim 1, wherein the plurality of settings each result in a different position of the shutter plate.

9. The portable device according to claim 1, wherein the plurality of settings comprises 23 different positions.

10. The portable device according to claim 1, further comprising:
    a trigger lock configured to secure the trigger in the second position when engaged.

11. The portable device according to claim 10, the trigger lock being further configured to prevent movement of the trigger from the first position.

12. The portable device according to claim 1, the trigger mechanism further comprising:
    a first spring connected to an upper portion of the trigger mechanism; and
    a second spring connected to a lower portion the trigger mechanism.

13. The portable device according to claim 12, further comprising:
    a stop connected to an upper end of the second spring such that the second spring is compressed upon the stop contacting the shutter cam in response to movement of the trigger mechanism.

14. The portable device according to claim 1, the trigger mechanism comprising:
    a frame comprising a dividing frame member, centrally located in the frame, dividing the frame into an upper and a lower portion, the dividing frame member having an upper surface and a lower surface;
    a first spring located in the upper portion;
    a second spring located in the lower portion;
    the first spring being attached at its lower extremity to the upper surface and extending upwardly therefrom and having its upper extremity attached to a fixed projection of the portable device that is separate from the frame such that the first spring is compressed during upward movement of the trigger mechanism;
    a stop member located below the dividing frame member comprising a first portion contacting, but not connected to, the lower surface dividing frame member and held in place by the second spring, and the second spring being attached at its lower extremity to a lower portion of the frame and extending upwardly therefrom such that its upper extremity is attached to the stop member, and the stop member further comprises a second portion configured to contact the shutter cam upon upward movement of the trigger mechanism in response to movement of the trigger from the first position to the second position causing a compression of the second spring in response to the contact with the shutter cam.

15. A portable hand-held spreader device comprising:
a hopper for holding an amount of granular product for spreading over terrain or other surfaces, comprising an outlet for exhausting the granular product;
a handle means for holding a container;
an opening located on a forward portion of a spreader body;
a spreading means for spreading the granular product located in the opening below the handle and driven by a power source;
an agitator means for agitating the granular product located within the hopper and proximate the outlet;
a control means for controlling a distance of travel of a shutter plate located inside of the outlet and mechanically coupled to the control means, the control means being coupled to the forward portion of the spreader body and having a plurality of settings, such that each setting adjusts the distance of travel of the shutter plate with respect to the outlet;
a trigger mechanism for actuating the power source and moving the shutter plate the distance according to the setting of the control means, the trigger mechanism further comprising:
a first spring connected to an upper portion of the trigger mechanism, and
a second spring connected to a lower portion the trigger mechanism; and
a stop connected to an upper end of the second spring such that the second spring is compressed upon the stop contacting the shutter cam in response to movement of the trigger mechanism.

16. The portable hand-held spreader device according to claim 15, wherein the trigger mechanism has a first, default position in which the power source is not actuated and the shutter plate covers the outlet and a second, actuated position in which the power source is actuated and the shutter plate is retracted from the outlet and travels the distance based on the setting of the control means.

17. The portable hand-held spreader device according to claim 15, wherein the granular product comprises ice melting granules, fertilizer, pesticides, granular soil amendment material, granular oil absorbent material, dusting products, granular floor cleaning product, grass seed, or combinations thereof.

18. The portable hand-held spreader device according to claim 15, wherein the power source comprises:
a power transfer means for transferring power from the power source to the spreading means.

19. The portable hand-held spreader device according to claim 15, wherein the plurality of settings comprises 23 different positions.

20. The portable hand-held spreader device according to claim 15, further comprising:
a locking means for securing the trigger mechanism in the second position when engaged.

21. The portable hand-held spreader device according to claim 15, further comprising:
a locking means for securing the trigger mechanism in the first position when engaged.

22. The portable device according to claim 15, wherein the handle means is located at a forward portion of the container.

23. The portable hand-held spreader device according to claim 22, wherein the handle means is rearward facing and overhangs the hopper.

24. A portable hand-held spreader device, comprising:
a hopper configured to contain granular product for spreading over terrain or other surfaces comprising an outlet;
a handle overhanging the hopper;
a motor;
a gear train driven by the motor;
a rotor plate, located below the outlet and driven by the gear train, configured to spread the granular product;
an agitator, mounted in the hopper, proximate the outlet, driven by the gear train;
a trigger mounted in the handle;
a trigger mechanism, coupled to the trigger, comprising a first spring, a second spring, and a stop;
a shutter plate coupled to the trigger mechanism for covering and uncovering the outlet;
a rotary dial rotatably movable between a plurality of settings;
a shutter cam, coupled internally to the rotary dial, for adjusting a distance of travel the shutter plate based on a selected setting of the rotary dial through contact with the stop; and
the shutter plate being coupled to the shutter cam and being movable with respect to the outlet, the shutter plate being movable such that when the trigger is in a first position the shutter plate covers the outlet and when the trigger is in a second position, the shutter plate is retracted from the outlet through movement of the trigger mechanism, uncovering the outlet by traveling a distance based on the selected setting of the rotary dial such that retraction of the shutter plate stops when the stop contacts the shutter cam and the first spring is compressed during movement of the trigger mechanism and the second spring is compressed upon the stop contacting the shutter cam.

25. The portable device according to claim 24, further comprising:
a trigger lock configured to secure the trigger in the second position when engaged.

26. The portable device according to claim 25, the trigger lock being further configured to prevent movement of the trigger from the first position when engaged.

27. The portable device according to claim 24, wherein the plurality of settings comprises 23 different positions.

* * * * *